US009992683B2

(12) United States Patent
Cronin

(10) Patent No.: US 9,992,683 B2
(45) Date of Patent: Jun. 5, 2018

(54) SECURE COMMUNICATIONS WITH WEARABLE DEVICES

(71) Applicant: KONINKLIJKE PHILIPS N.V., Eindhoven (NL)

(72) Inventor: John Cronin, Bonita Springs, FL (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days. days.

(21) Appl. No.: 15/548,327

(22) PCT Filed: Feb. 1, 2016

(86) PCT No.: PCT/EP2016/052087
§ 371 (c)(1),
(2) Date: Aug. 2, 2017

(87) PCT Pub. No.: WO2016/124549
PCT Pub. Date: Aug. 11, 2016

(65) Prior Publication Data
US 2018/0035297 A1    Feb. 1, 2018

Related U.S. Application Data

(60) Provisional application No. 62/110,673, filed on Feb. 2, 2015, provisional application No. 62/113,652, filed on Feb. 9, 2015.

(30) Foreign Application Priority Data

Jul. 7, 2015    (EP) ..................................... 15175660

(51) Int. Cl.
*H04W 12/08*    (2009.01)
*H04L 29/06*    (2006.01)
(Continued)

(52) U.S. Cl.
CPC ........... *H04W 12/08* (2013.01); *H04L 63/105* (2013.01); *H04W 12/02* (2013.01); *H04W 12/04* (2013.01); *H04L 63/083* (2013.01)

(58) Field of Classification Search
CPC ..... H04W 12/08; H04W 12/04; H04W 12/02; H04L 63/105; H04L 63/083
See application file for complete search history.

(56) References Cited

U.S. PATENT DOCUMENTS 9,600,676 B1 *    3/2017    Farmer .................. G06F 21/62
9,754,097 B2 *    9/2017    Hessler .................. G06F 21/44
(Continued)

FOREIGN PATENT DOCUMENTS

WO    2013096954 A1    6/2013

*Primary Examiner* — Darren B Schwartz
(74) *Attorney, Agent, or Firm* — Sherry Womack Austin

(57) ABSTRACT

Various embodiments described herein include systems and methods directed towards allowing a wearable device with one or more sensors to communicate with a third-party network or device. The wearable device's software may include user interfaces wherein a user may select a data set from a particular sensor and allocate a security level associated with that sensor's data and with a particular third-party network. Different security levels may be correlated to different protections, such as encryption or password-protection of data, or ensuring that an agreement has been signed, or ensuring that the third party is identified in a database before transmission. Before sending any sensor data or receiving any third party data, the wearable device may check this user-allocated security level, executes any required security precautions, and allows or denies the data transfer accordingly. Security levels may also govern receipt of data by the wearable device from the third party.

13 Claims, 16 Drawing Sheets

(51) Int. Cl.
*H04W 12/04* (2009.01)
*H04W 12/02* (2009.01)

(56) References Cited

U.S. PATENT DOCUMENTS

| | | | | |
|---|---|---|---|---|
| 2002/0173296 A1* | 11/2002 | Nordman | .............. | H04L 67/306 455/414.1 |
| 2004/0106415 A1* | 6/2004 | Maeda | .................. | G01S 5/0027 455/456.1 |
| 2005/0043973 A1* | 2/2005 | Childers | ............... | G06F 21/606 705/5 |
| 2005/0055560 A1* | 3/2005 | Kendon | .............. | G06F 21/6245 713/189 |
| 2006/0235801 A1* | 10/2006 | Strom | ..................... | G06F 21/10 705/59 |
| 2006/0277474 A1* | 12/2006 | Robarts | .................. | G06Q 10/10 715/745 |
| 2007/0072564 A1* | 3/2007 | Adams | ................ | G06F 21/6218 455/115.1 |
| 2007/0265533 A1* | 11/2007 | Tran | ........................ | A61B 5/021 600/481 |
| 2009/0043681 A1* | 2/2009 | Shoji | .................... | G06F 21/335 705/35 |
| 2009/0307767 A1* | 12/2009 | Semba | .................... | G06F 21/34 726/18 |
| 2010/0135494 A1* | 6/2010 | Armknecht | ............. | H04L 9/083 380/270 |
| 2010/0205425 A1* | 8/2010 | Takacs | .................... | G06F 21/32 713/100 |
| 2010/0250959 A1* | 9/2010 | Challener | ............ | H04L 9/0897 713/189 |
| 2011/0288874 A1* | 11/2011 | Hinkamp | ............. | G06F 21/6245 705/1.1 |
| 2012/0151553 A1* | 6/2012 | Burgess | .................. | G06F 21/00 726/1 |
| 2013/0232542 A1* | 9/2013 | Cheng | ................ | G06F 21/6218 726/1 |
| 2013/0317753 A1* | 11/2013 | Kamen | ............... | G06F 19/3418 702/19 |
| 2013/0343543 A1 | 12/2013 | Blaisdell et al. | | |
| 2015/0234986 A1* | 8/2015 | Dantsker | ............. | G06F 19/324 705/2 |
| 2015/0257104 A1* | 9/2015 | Choi | .................. | H04W 52/0229 455/41.3 |
| 2015/0261949 A1* | 9/2015 | Mori | ....................... | G06F 21/31 726/19 |
| 2016/0034707 A1* | 2/2016 | Sahu | ..................... | H04W 12/02 713/168 |
| 2016/0037346 A1* | 2/2016 | Boettcher | ........... | H04M 1/72519 455/411 |
| 2016/0164867 A1* | 6/2016 | Jung | ................... | H04L 63/0861 713/186 |
| 2016/0196558 A1* | 7/2016 | Mercille | .............. | G06Q 20/327 705/44 |
| 2016/0248809 A1* | 8/2016 | Smith | ................. | H04L 63/0435 |
| 2017/0180332 A1* | 6/2017 | Cheng | ................ | H04L 63/0428 |

* cited by examiner

SECURE COMMUNICATIONS WITH WEARABLE DEVICES

CROSS-REFERENCE TO RELATED APPLICATIONS

The present application claims the priority benefit of U.S. provisional application No. 62/120,673 filed Feb. 2, 2015 and entitled "User Controller Wearable Data," the entire disclosure of which is hereby incorporated by reference for all purposes.

The present application claims the priority benefit of U.S. provisional application No. 62/113,652 filed Feb. 9, 2015 and entitled "Wearable Device Communication Using Security Levels," the entire disclosure of which is hereby incorporated by reference for all purposes.

TECHNICAL FIELD

The present disclosure generally relates to security in wearable technology. More specifically, but not exclusively, the present disclosure relates to access control and encryption of communications involving wearable devices.

BACKGROUND

Wearable technology may include any type of mobile electronic device that can be worn on the body or attached to or embedded in clothes and accessories of an individual. The designs of wearable technology often incorporate practical functions and features, but may also have a purely critical or aesthetic agenda. Processors and sensors associated with the wearable technology can gather, process, and display information to a user. Wearable technology may be utilized in a variety of areas including monitoring health data of a user and providing other types of data and statistics. Examples of some wearable technology in the health arena include the FITBIT FLEX, NIKE+ FUEL BAND, JAWBONE UP, and APPLE WATCH devices.

SUMMARY

Various embodiments include systems and methods directed towards allowing a wearable device with one or more sensors to communicate with a third party network or device.

Various embodiments described herein relate to a method for secure connections, the method including: receiving a security level input at an interface of a wearable device, the security level input identifying a sensor set including one or more types of sensor measurements from one or more sensors of the wearable device, the security level input further identifying that data corresponding to the sensor set should be transmitted to a recipient device according to a predetermined security level setting, the predetermined security level setting indicating at least whether the data corresponding to the sensor set is to be encrypted prior to transmission to the recipient device; determining that a sensor measurement data set is to be transmitted to another device and corresponds to the sensor set, wherein the sensor measurement data set includes one or more sensor measurements from one or more sensors of the wearable device and wherein the one or more sensor measurements correspond to one or more of the types of sensor measurements included in the sensor set; and transmitting the sensor measurement data set from the wearable device to the recipient device according to the security level setting identified by the security level input for the sensor set.

Various embodiments described herein relate to a system for secure connections, the system including: a wearable device with a wearable memory and a wearable processor, wherein executing instructions stored in the wearable memory by the wearable processor: receive a security level input at an interface of a wearable device, the security level input identifying a sensor set including one or more types of sensor measurements from one or more sensors of the wearable device, the security level input further identifying that data corresponding to the sensor set should be transmitted to a recipient device according to a predetermined security level setting, the predetermined security level setting indicating at least whether the data corresponding to the sensor set is to be encrypted prior to transmission to the recipient device; determine that a sensor measurement data set is to be transmitted to another device and corresponds to the sensor set, wherein the sensor measurement data set includes one or more sensor measurements from one or more sensors of the wearable device and wherein the one or more sensor measurements correspond to one or more of the types of sensor measurements included in the sensor set; and transmit the sensor measurement data set from the wearable device to the recipient device according to the security level setting identified by the security level input for the sensor set.

Various embodiments described herein relate to a non-transitory computer-readable storage medium, having embodied thereon a program executable by a processor to perform a method for providing secure connections, the method including: receiving a security level input at an interface of a wearable device, the security level input identifying a sensor set including one or more types of sensor measurements from one or more sensors of the wearable device, the security level input further identifying that data corresponding to the sensor set should be transmitted to a recipient device according to a predetermined security level setting, the predetermined security level setting indicating at least whether the data corresponding to the sensor set is to be encrypted prior to transmission to the recipient device; determining that a sensor measurement data set is to be transmitted to another device and corresponds to the sensor set, wherein the sensor measurement data set includes one or more sensor measurements from one or more sensors of the wearable device and wherein the one or more sensor measurements correspond to one or more of the types of sensor measurements included in the sensor set; and transmitting the sensor measurement data set from the wearable device to the recipient device according to the security level setting identified by the security level input for the sensor set.

Various embodiments are described wherein transmitting the sensor measurement data set from the wearable device to the recipient device according to the security level setting includes: transmitting the sensor measurement data set from the wearable device to a security device according to the security level setting, whereby the security device is enabled to further transmit the sensor measurement data set to the recipient device according to the security level setting.

Various embodiments are described wherein the predetermined security level setting indicates that the sensor measurement data is to be password-protected prior to transmitting the sensor measurement data from the wearable device to the recipient device, so that the sensor measurement data is not readable without a correctly entered password.

Various embodiments additionally include receiving an edit input through an edit interface of the wearable device, the edit input editing the sensor measurement data prior to transmission of the sensor measurement data set from the wearable device to the recipient device.

Various embodiments additionally include receiving a sender data set from a sender device identified by the security level input; and accepting the sender data set according to a second predetermined security level setting of the security level input.

Various embodiments additionally include transmitting a security key from the security device to the recipient device, wherein the security key can decrypt the sensor measurement data set.

Various embodiments additionally include transmitting a security key from the wearable device to the recipient device, wherein the security key can decrypt the sensor measurement data set.

Various embodiments are described wherein the sensor set includes a calculation set that is calculated based on a second one or more types of sensor measurements from the one or more sensors.

Various embodiments are described wherein the sensor set includes a trigger data set that indicates alert actions to be performed by the wearable device based on a second one or more types of sensor measurements from the one or more sensors, the alert actions to alert a user of the wearable device that a second one or more sensor measurements have reached a potentially dangerous value.

According to various embodiments, a wearable user is enabled to enforce security on a per-sensor or per-parameter basis. Rather than applying a "one-size-fits-all" approach to data security, the user can individually define which sensors/parameters/etc. are to be shared with whom and how such sharing should occur.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. Further, as used herein, the term "exemplary" is merely indicative of an instructive example and does not imply that the described embodiment is superior or otherwise preferred to other embodiments.

A wearable device can be used to gather data about the user. For example, a wearable device can use one or more sensors to monitor health parameters (e.g., heart rate) of a user. Some wearable devices are designed to send data to or receive data from another device (e.g., a mobile device). However, such communications from wearable devices are typically not secure, or are designed with very minimal security in mind. This can raise privacy concerns among potential users, particularly when the wearable transmits data that, if intercepted, could reveal the user's location history, purchase history, finances, health measurements, or medical conditions.

The present disclosure generally describes systems and methods directed towards allowing a wearable device with one or more sensors to communicate with a third party network or device. In particular, the wearable device's software can include user interfaces wherein a user can select a data set from a particular sensor and allocate a security level associated with that sensor's data and with a particular third party device or network. Different security levels may require different protections, such as encryption or password-protection of data, or ensuring that an agreement (e.g., with a doctor) has been signed, or ensuring that the third party is identified in a database (e.g, a database of a broadcaster, the wearable device's manufacturer, or a trusted third party). Before sending any sensor data or receiving any third party data, the wearable device may check this user-allocated security level, execute any required security precautions, and allow or deny the data transfer accordingly.

Figure 1:
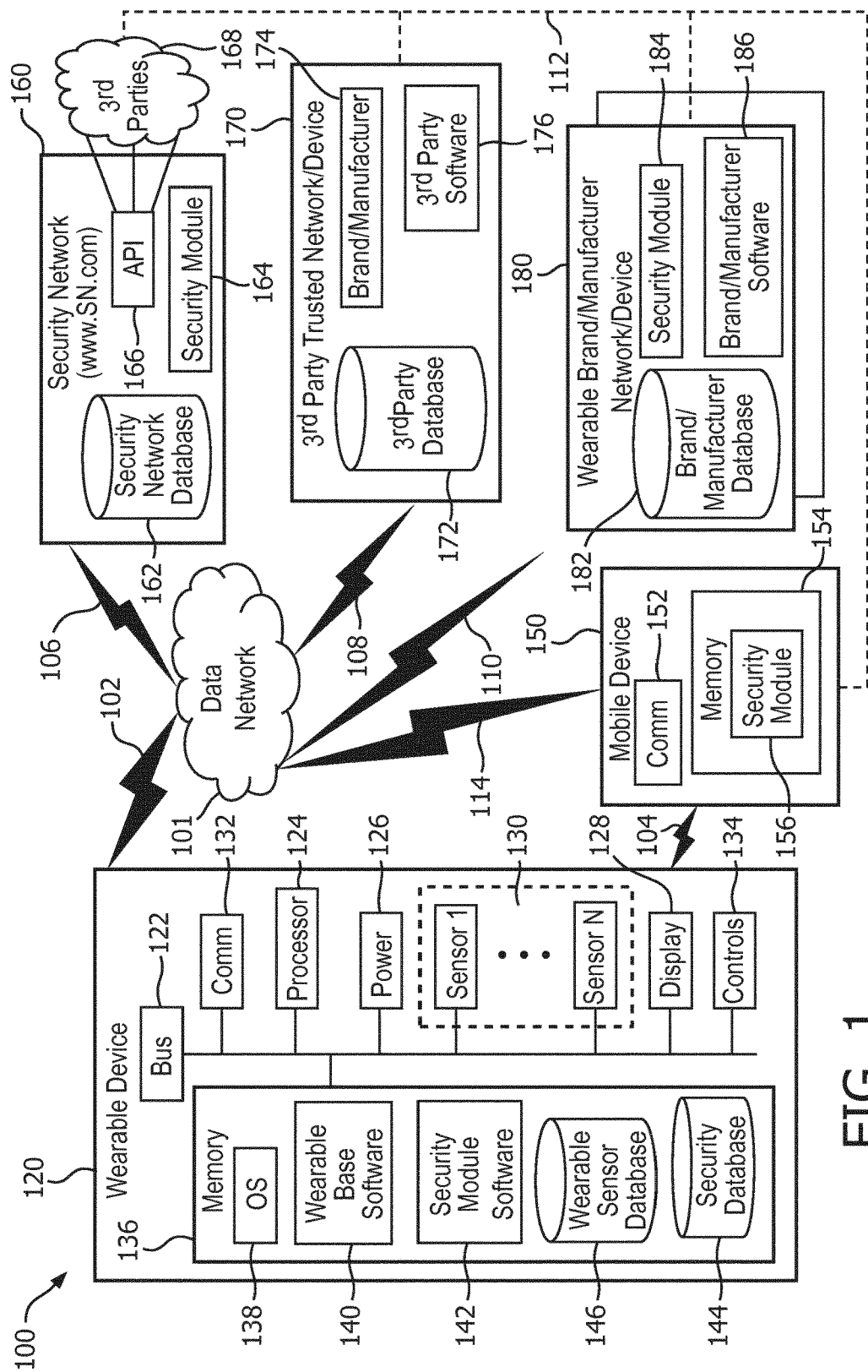
FIG. 1 illustrates an exemplary ecosystem including an exemplary wearable device, and exemplary mobile device, an exemplary security network, and connected to a variety of exemplary networks.

FIG. 1 illustrates an exemplary ecosystem 100 including an exemplary wearable device 120, and exemplary mobile device 150, an exemplary security network 160, and a variety of other exemplary networks 170, 180 in communication via a cloud network, the Internet, LAN, carrier network, or other data network 101.

The wearable device 120 may include a variety of components. In some embodiments, these components are all connected to a single bus 122, as illustrated in FIG. 1. Alternatively, these components could instead be connected through multiple buses (not pictured) according to a more complex architecture. The plurality of components may include a memory 136, one or more displays 128 (which may be touch-sensitive), one or more sensors 130 ("Sensor 1"- . . . -"Sensor N"), a power storage unit 126 ("power") (e.g., a battery) (which, in some embodiments, may not be connected to the bus 122 at all), a set of physical controls 134, a wired and/or wireless communication module 132, and a processor 124 such as, for example, a microprocessor, field programmable gate array (FPGA), application specific integrated controller (ASIC), or any other device capable of performing the data processing or other functions described herein. In various embodiments, the memory 120 may include L1/L2/etc. cache, system memory, or storage devices (e.g., flash memory). As used herein, the term "non-transitory machine-readable media" will be understood to encompass all such memories, whether volatile or non-volatile, but to exclude transitory signals.

The wearable device memory 136 may be operable to store various sets of instructions defining software elements and data structure elements. For example, the memory 136 may include a wearable device operating system 138 ("OS"), a wearable device base software 140 ("Wearable Base Software"), a wearable device sensor database 148 ("Wearable Database") (that may store sensor measurements), a wearable device security database 144 (which may store security settings and/or trusted $3^{rd}$ party identities), a wearable device security module software 142 (which may control interact with security network 160).

As will be understood, while various embodiments are described in terms of functionality being "performed" by software resident on the wearable device 120, mobile device 150, security network 160, other networks 170, 180, or any other devices, that such functionality will actually be performed by hardware such as the processor 124 or processors on such other devices (not shown) executing software instructions. In some embodiments, such as those wherein a processor (e.g. processor 124) includes one or more ASICs, some or all of the described functionality may instead be implemented in hardware and, as such, the corresponding software instructions may be omitted. Further, while specific hardware components may not be described in detail for some devices, it will be apparent that, in at least some embodiments, these devices include real hardware such as, for example, processors, memories, and communication interfaces similar to those described above with respect to the wearable device 120.

The wearable device 120 architecture illustrated in FIG. 1 should be interpreted as illustrative rather than limiting. Other embodiments of the wearable device 120 may include additional or different components and/or elements stored in memory, and/or may lack illustrated components or elements stored in memory.

The communication module 132 of the wearable device 120 may include a wired connection module (e.g., a USB port module, a FireWire port module, a Lightning port module, a Thunderbolt port module), a physical connection module (e.g., that communicates through a direct physical contact of one or more conductive leads of the wearable device 120 to one or more conductive leads of another device, connector, or power source), a wireless connection module (e.g., a Wi-Fi connection module, a 3G/4G/LTE cellular connection module, a Bluetooth connection module, a Bluetooth low energy connection module, Bluetooth Smart connection module, a near field communication module, a radio wave communications module, a magnetic induction power transmitter/receiver, or a magnetic resonance power transmitter/receiver), or some combination thereof.

The wearable device 120 can connect to the data network 101 through the communication module 132 of the wearable device 120. In some embodiments, the wearable device 120 cannot connect directly to the data network 101, but may connect to the data network 101 through a proxy device, such as the mobile device 150. For example, the wearable device 120 could connect to the mobile device 150 through a wired or local wireless communications interface (e.g., universal serial bus or Bluetooth) connection 104, upon which the mobile device 150 may then communicate with the internet-connected networks/devices/services (160, 160, 180, 190) of the exemplary ecosystem of FIG. 1 through a data network 101 connection 106 (e.g., Ethernet connection, Wi-Fi connection, 3G cellular connection, 4G cellular connection, Long Term Evolution cellular connection, Edge cellular connection) and act an intermediary or "middleman" for communications between the wearable device and the network.

The one or more wearable device sensors 130 of the wearable device 120 may include sensors for measuring various physiological parameters (or data useful in computing, extracting, or otherwise deriving physiological parameters) such as blood pressure, heart rate, pulse, blood oxygen (e.g., a pulse oximeter), body temperature (e.g., a thermometer), blood sugar, blood glucose (e.g., a glucometer), acceleration (e.g., an accelerometer), insulin, vitamin levels, respiratory rate, heart sound (e.g., a microphone), breathing sound (e.g., a microphone), movement speed (e.g., an accelerometer), movement acceleration (e.g., an accelerometer), steps walked or ran (e.g., a pedometer), skin moisture, sweat detection, sweat composition, nerve firings (e.g., an electromagnetic sensor), or similar health measurements. In some embodiments, the sensors 130 may also include sensors measuring environmental parameters such as allergens, air quality, air humidity, air temperature, and similar environmental measurements.

The power storage unit 124 may be any type of unit capable of storing power over a period of time, such as a rechargeable battery (e.g., Nickel Cadmium or "NiCd", Nickel Metal Hydride or "NiMH", Lithium Ion or "Li Ion", Sealed Lead Acid or "SLA"), a capacitor, a potential-energy-based power storage unit, a chemical-energy-based power storage unit, a kinetic-energy-based power storage unit, or some combination thereof. Reference to the "battery 124" or "power supply 124" of the wearable device herein should be understood to refer to any of these types of power storage units 124.

The display 128 may be a touch-sensitive display (e.g., a capacitive multi-touch display) to allow a user to interact with a graphical user interface displayed through the display. The display 128 can also be non-touch-sensitive, and any user interfaces described herein may be instead operated through physical/mechanical interface components such as buttons, radio buttons, levers, switches, wheels, sliders, touchpads, keyboards, mice, and other physical/mechanical interface elements embedded within or connected to the wearable device 120 (e.g., controls 134). The display 128 may be a liquid crystal display (LCD), gas plasma display, electronic ink display, light emitting diode (LED) display, Organic LED (OLED) display, field emission display (FED), surface-conduction electron-emitter display (SED), cathode ray tube (CRT) display, or any other type of light-reflective or light-transmissive display that can be used with a computing device. In some devices, the display 128 may be omitted entirelty; in some such embodiments, the mobile device 150 or another device may serve as a GUI to the wearable device 120 by displaying information received from the wearable device 120 or transmitting user commands to the wearable device 120 via the direct connection 104 or through the data network 101 via connections 102, 114.

The memory 136 of the wearable device 120 may be any type of memory, including a flash memory (NOR flash or NAND flash), an electrically erasable programmable read-only memory (EEPROM), read-only memory (ROM), solid-state memory, random access memory (RAM), dynamic random access memory (DRAM), a hard drive (HDD), an optical-disc-based memory, a floppy-disk-based memory, a memristor-based memory, or a magnetic-tape-based memory.

The databases (146, 144, 148) stored in the memory 136 of the wearable device 120 may, in some embodiments, be a different type of data structure than a traditional database. Reference to the term "database" or "databases" herein should be understood to include any data structure that can hold data about one or more entities, such as a database, a table, a list, a matrix, an array, an arraylist, a tree, a hash, a flat file, an image, a queue, a heap, a memory, a stack, a set of registers, or a similar data structure.

The wearable device 120 may include other components that could reasonably fit into a wearable device, or be connected (in a wired or wireless fashion) to a wearable device. For example, the wearable device may include one or more speakers, one or more microphones, one or more lights (e.g., LED lights), one or more camera devices, or one or more thermal sensors.

The wearable device 120 may be primarily worn around a user's wrist (e.g., a watch or bracelet), neck (e.g., a necklace or scarf), arm (e.g, an armband or elbow brace), hand (e.g, a glove), finger (e.g., a ring), head (e.g., a hat or helmet or headband or headlamp), leg (e.g., a knee brace or leg holster or pair of pants), torso (e.g., a shirt or sweater or jacket), chest (e.g., a heart monitor chest band/patch, a respiratory monitor chest band/patch), pelvic area (e.g., an undergarment or a swimsuit or a jock strap), waist (e.g., a belt), foot (e.g., a shoe or sock or ankle brace), or another area of the user's body.

The exemplary ecosystem 100 of FIG. 1 also includes a mobile device 150. The mobile device may include a variety of elements, such as a communications module 162, a memory (not shown), and a processor (not shown). The memory of the mobile device may store, and the processor of the mobile device may execute, a security module 164 (that may interact with the security network 160). The security module 164 includes instructions for defining one or more of the various security-related functions described herein below.

The mobile device 150 architecture illustrated in FIG. 1 should be interpreted as illustrative rather than limiting. Other embodiments of the mobile device 150 may include additional or different components and/or elements stored in memory, and/or may lack illustrated components or elements stored in memory.

The communication module 150 of the mobile device 150 may include a wired connection module (e.g., a USB port module, a Fire Wire port module, a Lightning port module, a Thunderbolt port module), a physical connection module (e.g., that communicates through a direct physical contact of one or more conductive leads of the mobile device 150 to one or more conductive leads of another device, connector, or power source), a wireless connection module (e.g., a Wi-Fi connection module, a 3G/4G/LTE cellular connection module, a Bluetooth connection module, a Bluetooth low energy connection module, Bluetooth Smart connection module, a near field communication module, a radio wave communications module, a magnetic induction power transmitter/receiver, or a magnetic resonance power transmitter/receiver), or some combination thereof.

The mobile device 150 can be a smart phone, a tablet device, a desktop computer, a laptop computer, a gaming console, a smart television, a home entertainment system, a second wearable device, or any other device the user may use to communicatively interact with the wearable device 110 (e.g., through direct connection 104 or through connections to the data network 101).

The exemplary ecosystem of FIG. 1 also includes an exemplary security network 160. It will be understood that, while the term "network" is used to describe various entities 160, 170, 180 with which the wearable device 120 or mobile device 150 may communicate, these networks may actually be single servers, other devices, or networks thereof. For example, the security network 160 may be a single virtual machine (VM) running on a server in a cloud computing architecture. Where a network 160, 170, 180 includes multiple devices, each device may implement all of the functionality ascribed to the network, or different devices may implement different features. For example, the third party trusted network 170 may include a cloud-based VM storing the third party database 172, two VMs implementing the brand/manufacturer module, one of which also implements the third party software 176. Numerous alternative arrangements and further refinements (e.g., load balancers distributing requests between redundant VMs or functions thereof) will be apparent.

In the exemplary ecosystem 100 of FIG. 1, the exemplary security network 160 is identified as "www.SN.com." The security network 160 includes a security network database 162, a security module 164, and an application programming interface (API) 166. The API 166 can be used by third party devices 168 or third party networks (e.g., third party trusted network/device 170, wearable brand/manufacturer network/device 180, mobile device 150) to access or edit the security network 160's security network database 162. An incentive for a third party 168 to access or edit the security network 160's security network database 162 is to access data from a wearable device 120's wearable sensor database 146. In some embodiments, the security network database 162 may also store identities of trusted third parties 168 (and, in some embodiments, authentication information associated therewith).

As an example, a gymnasium (as a third party 168) might use the security network 160's API 166 to access the security network database 162 and therefore access the wearable device's data. If a user wearing a wearable device 120 inputs that gymnasium's URL into a broadcaster graphical user interface (GUI) 310 (see e.g., the exemplary broadcaster GUI of FIG. 4) of the wearable device 120's security module software 142, then the security network 160 can know that the gymnasium is a trusted third party 170, and can allow the gymnasium access to the wearable device's data through the security network database. In an alternate embodiment, the security database 144 does not store the actual sensor data from the wearable device 120's sensors 130 (i.e., from the wearable sensor database 146), but instead stores a password or encryption key that can be given to a trusted third party 168 using the API 166 so that the third party 168 can then access the wearable device 120's sensor data directly from the wearable device 120's sensors 130 or directly from the wearable sensor database 146. In another alternate embodiment, the third party 168 identified by the user through the broadcaster GUI 310 may have its identity stored in the security network database 162, which may then grant it access to the wearable device through the security network 160 as a proxy.

Regardless of how a third party ultimately connects through the security network 160 to the wearable device 120, the user of the wearable device 120 can set a "security level" associated with the third party 168 (e.g., the exemplary gymnasium previously discussed) within the broadcaster GUI (see e.g., the exemplary broadcaster GUI 310 of FIG. 4) of the wearable device 120's security module software 143 or the mobile device 150 security module software 156. The user may adjust settings within the broadcaster GUI 310 that allows the user to predetermine which sensor data the third party 168 (e.g., gymnasium) is allowed to access (e.g., only allow gymnasium to access "calories burned" value, but not "blood pressure" value). The user of the broadcaster GUI 310 may be further able to predetermine if that data should be sent in a secure manner, and if so, how securely it should be sent compared to other data (e.g., password-protected or encrypted) (see e.g., exemplary security levels of FIG. 2). The wearable device 120's security module software 142 thus checks what security level decisions the user made in the broadcaster GUI 310 for each type of sensor data from one of the sensors 130, and transmits to the third party 168 (e.g., gymnasium) only what sensor (or other) data the user has approved the wearable device 120 to transmit, and only using the type or "level" of security precautions that the user has decided to use on the sensor (or other) data. The encryption, password protection, certificate authentication, and other security features may be performed partly at the security module software 142 of the wearable device 120 and party at the security module 164 of the security network 160. In various alternative embodiments, the security module 156 of the mobile device 150 may instead perform these security functions and the security module software 142 of the wearable device 120 may server only to make sure that secured data (or all data) is only transmitted by the wearable device 120 to the mobile device 150 (e.g., encrypted using a public key of the mobile device 150) where the security module 156 may handle more the complex security functions and decision.

Depending on a security level chosen by the user in the broadcaster GUI 310 of the security module software 142, the third party 168 (e.g., gymnasium) may in some embodiments also transmit data to the wearable device 120. For instance, the gymnasium could provide a coupon to the wearable device 120 as a reward for frequent patronage by the user of the wearable device 120, or as a reward for the user burning a milestone number of calories during a visit to the gymnasium.

The security network 160 may be a provider to a trusted third party security network 160 that may supply a security module (e.g., 142, 154, 164, 174, 184) that can be loaded into various elements of the system including the wearable device 120, the mobile device 150, the third party network/device 170, and the wearable brand/manufacturer network/device 180. The security network 160 may allow the user of the wearable device 120 to program various levels of security for different levels of data being transmitted from the wearable device to be implemented for the different types of receivers of the data, for example through the broadcaster GUI 310 of the wearable device 120 or, in some embodiments, the mobile device 150.

The various elements (e.g., wearable device, mobile device 150, $3^{rd}$ party network and manufacturer) can be classified into two groups: sending devices and receiver devices. In some embodiments, some devices may take on multiple roles and, as such, may be classified in both groups and handled according to membership in one of the groups based on the role being filled at the time of handling.

Depending on the classification, the security network 160 may perform different functions for the particular device. In particular, the security network 160 can be utilized by the wearable device 120 to set up the scrambling of the data, password or security keys to secure any data to be transmitted to or received from third parties 168. If the data is protected the third parties 168 may only extract the data being transmitted from the wearable device 120 if the wearable device 170 allowed that particular third party 168 to obtain the encryption keys or passwords. The security network 160 may include its own database that identifies the wearable device 120 as well as corresponding permissions related to identified third parties 168 or encryption keys or passwords or actual (secured or unsecured) data from the wearable sensor database 146. Upon authorization from the wearable device 120 (or by proxy from the security network 160), a "receiver" device (e.g., the mobile device 160, a third party network/device 170, a wearable brand/manufacturer network/device 180) may obtain access to the data (e.g., by receiving the encryption keys and/or passwords, or by receiving permission to receive the data as unencrypted by the security network 160) in order to properly read the transmitted data from the wearable device.

FIG. 1 also illustrates a third party trusted network/device 170. This includes a third party database 172, a security module 174 that may interact with the security network 160, and a third party software 176. The third party network/device 170 may belong to a third party 168 (e.g., a gymnasium, coffee shop, a restaurant, a social network, or other website). These third parties 168 may access wearable device data through the API 166 and security network database 162 or be identified within the security network as a trusted third party 168. In some embodiments, data may be transferred directly from the wearable device 120 to the third party network/device 170, which may use the security module 174 to read the data if it is encrypted or password-protected. Depending on the security level of the third party network/device 170 (e.g., as determined through the broadcaster GUI 310 of the wearable device 120's security module software 142), the third party network/device 170 may also be allowed to transmit data to the wearable device 120. This could be used, for example, to provide a coupon reward for frequent patronage to an establishment associated with the third party network/device 170 (e.g. a gymnasium, coffee shop, or restaurant), or to provide a discount incentive to passerby if they enter the establishment associated with the third party network/device 170 within a time limit, or to promote a product or service associated with the network/device 170 based on data from the wearable device 120 (e.g., promoting a healthy dish or drink to a user whose sensor data from sensors 130 indicates a high level of fitness).

FIG. 1 also illustrates a wearable brand/manufacturer network/device 180. This is a network/device associated with the brand and/or manufacturer of the wearable device 120. In some embodiments, the wearable brand/manufacturer network/device 180 may include a brand/manufacturer database 182, a security module 184 that may interact with the security network 160, and brand/manufacturer software 186. The wearable brand/manufacturer network/device 180 could be used, for example, to provide a wearable device 120 with firmware/software updates to the wearable device 120 from the brand/manufacturer of the wearable device 180, or sometimes to perform services or calculations using the wearable device 120's sensor data from sensors 130 for the benefit of the wearable device 120 and/or its user. The wearable brand/manufacturer network/device 180 may also be treated as a third party 168 and may also use API 166. Communications between the wearable device 120 and the wearable brand/manufacturer network/device 180 may also be subject to security levels selected at the broadcaster GUI 310 of the security module software 142 of the wearable device 120.

A typical user with a wearable device 120, then, could use the broadcaster GUI 310 of the wearable device 120 to determine which third parties 168 can access which data from which sensor(s) of the sensors 130, and what type of security precautions to apply to the transmitted data, and also which third parties 168 can transmit data to the wearable device 120. The user can also use the broadcaster GUI 310 to decide any passwords that each/any of the third parties 168 must input in order to access the user's wearable device 120's data, or decide any messages that the wearable device 120 should send to these third parties 168 prior to or upon access of the wearable device 120's data.

In some embodiments, the wearable device 120 may synchronize data between the wearable sensor database 146 and the security network database 162 or the third party database 172 or the brand/manufacturer database 182. In some embodiments, the wearable device 120 may synchronize data between the wearable device's security database 144 and the security network database 162 or the third party database 172 and/or the brand/manufacturer database 182. In some embodiments, the wearable device 120 may continuously or periodically upload sensor and other data to a wearable device management framework, such as the AMAZON WEB SERVICES (AWS) Internet of Things (IoT) platform. In some such embodiments, the security network 160 may be implemented as part of the management framework or may communicate with the framework to facilitate security-enforced data transfer to and from other entities 150, 170, 180.

The user can also use a notification GUI 315 to determine how the wearable device 120 should notify the user when a third party 168 accesses sensor data (e.g., vibration, message, audio from a speaker, small electric shock), how the wearable device 120 should notify the user if a third party 168 transmits data to the wearable device 120 (e.g., vibration, message, audio from a speaker, small electric shock), whether these notifications should vary based on which third party 168 is performing, whether there should be a delay before notifying the user that a data access or data receipt event has occurred, and whether the wearable device 120 should identify the third party 168 to the user when a data access or data receipt event has occurred (e.g., by a unique vibration associated with that third party 168, by identifying the third party 168 on the display through text/image/video, or by identifying the third party 168 with audio played from a speaker).

In various embodiments, a user's wearable device 120, then, is by default storing its own sensor data in wearable sensor database 146. If the user desires it, some of the wearable device's sensor data can be encrypted even before storage at the wearable sensor database 146. While the user is walking around with (or otherwise going about their day wearing) his/her wearable device 120, the wearable device 120 can be pinged (i.e., receive a connection request) by third parties 168 (e.g., a coffee shop, a gymnasium, or any point of presence that has a connection that wants to read a wearable device for health reasons), either directly from the third party 168 or through a security network 160. The wearable device 120 can examine this ping or connection request, identify the third party 168 (e.g., using the security database 144 or security network database 162), and perform an action based on the request and based on any predetermined security level (e.g., as previously configured by the user through broadcaster GUI 310) stored at the security database 144 or security network database 162. In some embodiments, these third parties 168 are allowed to self-identify within their connection request. The wearable device 120's security module software 142 then executes a decision software 320 to determine what, if any, data can be shared, and how, according to the security level previously determined by the user and stored in the wearable device's broadcaster database. Various modifications for embodiments wherein some or all security functions are instead performed by the mobile device 150 (e.g., in some embodiments wherein the mobile device acts as an intermediary between the wearable device 120 and the data network 101) will be apparent.

Figure 2:
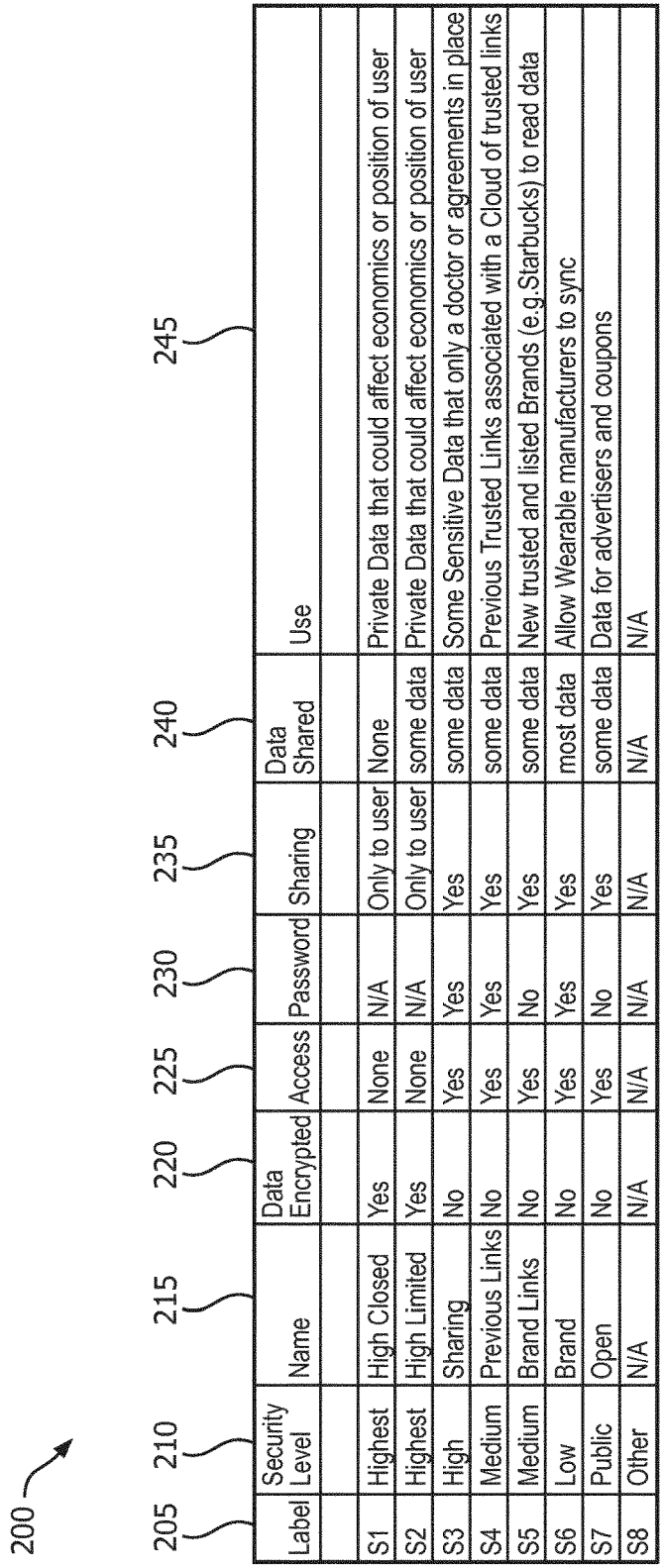
FIG. 2 illustrates an exemplary listing of security levels. This listing is intended to be illustrative rather than limiting, as very different security levels could be used.

FIG. 2 illustrates an exemplary listing of security levels. This listing is intended to be illustrative rather than limiting, as very different security levels could be used. In this embodiment, however, eight distinct security levels exist. The exemplary listing of security levels describes each according to characteristics described in a set of columns, including the "Label" column 205 identifying a codename of the security level, a "Security Level" column 210 describing how secure the security level is along a spectrum, a "Name" column 215 identifying a full name of the security level, a "Data encrypted" column 220 specifying whether the security level requires encryption of data, an "Access" column 225 identifying whether the connecting third party 168 should have access to data from the wearable sensor database 146, a "Password" column 230 identifying whether data sent under the security level should be password-protected, a "Sharing" column 235 that identifies allowed movement of data from the wearable device 120, a "Data shared" column 240 that identifies whether the third party 168 is permitted to transmit data to the wearable device 120, and a "Use" column 245 that posits an exemplary use case in which the security level may be used.

The highest security level in this embodiment is S1 ("High Closed"), meaning that the data under this security level is encrypted before storage, cannot be accessed by third parties, and data cannot be shared by or with the wearable device. Data under the S1 security level is the user's private data. The next highest security level is S2 ("High Limited"), meaning that the data under this security level is encrypted before storage, cannot be accessed by third parties, but that some data can be shared by or with the wearable device. A third party receiving data under the S2 security level would be expected to be trusted by the user, and thus should be capable of decrypting any shared data. Sensitive economic or location data could be stored under security level S1 or S2, for example.

The next highest security level is S3 ("Sharing"), meaning that the data under this security level is not encrypted, can be accessed by third parties 168 if they have a password, and where some data can be shared by or with the wearable device 120. Sensitive medical data that is to be shared with a doctor could be stored under security level S3, for example. The next highest security level is S4 ("Previous Links"), meaning that the data under this security level is not encrypted, can be accessed by third parties if they have a password, and where some data can be shared by or with the wearable device 120. Data that is to be shared with a previously trusted third party 168 could be stored under security level S4, for example. The next highest security level is S5 ("Brand Links"), meaning that the data under this security level is not encrypted, can be accessed by third parties 168 without requiring a password, and where some data can be shared by or with the wearable device 120. Data that is to be shared with a third party 168 that is trusted and identified by the security network 160 could be stored under security level S5, for example. The next highest security level is S6 ("Brand"), meaning that the data under this security level is not encrypted, can be accessed by third parties 168 if they have a password, and where most data can be shared by or with the wearable device 120. Data that is to be shared or synchronized between the wearable device 120 and the wearable brand/manufacture network/device 180 could be classified under this security level, for example. The lowest security level is S7, meaning that data under this security level can be sent freely by the wearable device 120 without additional security precautions, and that at least some types of data under this security level can be received freely without additional security precautions. Data that is to be with advertisers in exchange for coupons could be stored under this security level, for example.

The security listing of FIG. 2 also includes an eighth security level, S8, which is otherwise undefined. This indicates that a user can edit or add a custom security level if they choose to do so. Such a custom security level could be defined by the user through the broadcaster GUI 310 of the security module software 142 of the wearable device 120, for example. In other embodiments, all security levels may be custom-defined in this manner while, in some embodiments, custom-defined security levels may be unavailable.

Figure 3:
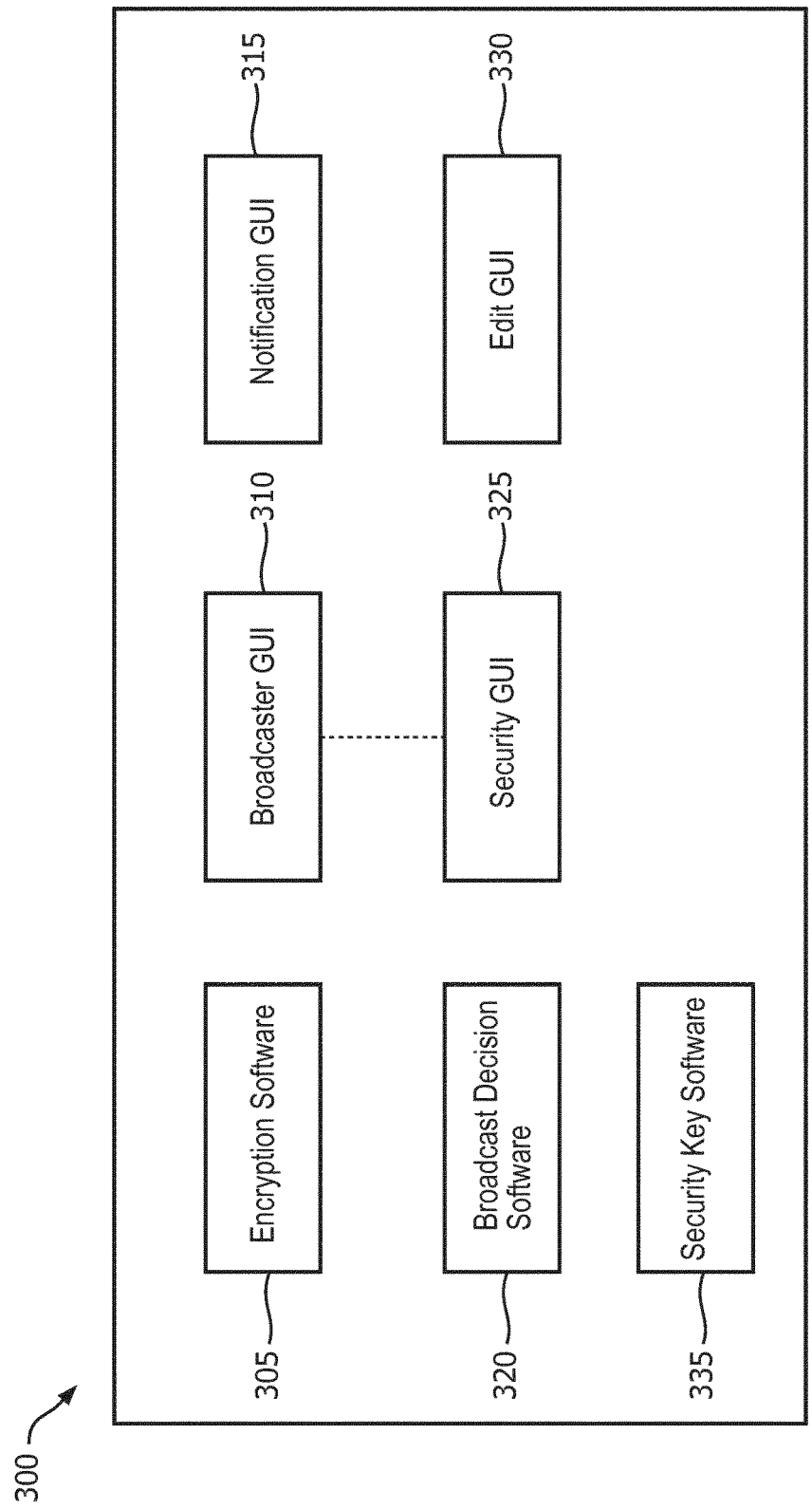
FIG. 3 illustrates an exemplary breakdown of an exemplary security module software of an exemplary wearable device.

FIG. 3 illustrates an exemplary breakdown 300 of an exemplary security module software 142 of an exemplary wearable device 120. The exemplary breakdown 300 of the exemplary security module software 142 of FIG. 3 breaks the exemplary security module software 142 into seven modules: the encryption software 305, the broadcaster GUI 310, the notification GUI 315, and the broadcast decision software 320, security GUI 325, edit GUI 330, and security key software 335.

One of these modules of the exemplary security module software 142 of FIG. 3 is the encryption software 305. The encryption software 305 can use one or more of any number of encryption algorithms, such as Pretty Good Privacy (PGP), RSA, Diffie-Hellman, or another encryption algorithm. The encryption module is used to encrypt sensor measurement data of the wearable device 120 at high security levels (e.g., exemplary high security levels S1 or S2 in the exemplary security level listing of FIG. 2). In some embodiments, a private encryption key associated with the wearable device 120 may be stored within the memory 136 of the wearable device and not made accessible directly to any third party 168. Public keys, however, may be distributed through the security network 160.

In some embodiments, the encryption software 305 may encrypt sensor data for both storage and transmission. Where the encryption software 305 uses a symmetric encryption algorithm, the encryption software may encrypt the sensor data according to a private key that is to be shared or will otherwise be known by devices to which the data will be made available. For example, in some embodiments, a private key may be associated with a security level (or groups thereof), used to encrypt any data associated with that security level, and distributed to any entities which will have access to data of that security level. In embodiments wherein the encryption software 305 uses asymmetric encryption at least for transmission of data, the encryption software may store the data in a first encrypted form and then, prior to transmission, decrypt and encrypt (or reencrypt to change the encryption in a single step according to various known methods for avoiding a discrete decryption step) the data according to the public key of the intended recipient. Alternatively, in some embodiments, a set of public and private keys may be generated for the entire security level (or a grouping thereof) for distribution to the devices which will have access to that security level. In such embodiments, similar to the symmetric encryption embodiment described above, the data may be encrypted according to the public key for storage and transmitted in the same encrypted form as stored.

A second module of the exemplary security module software 142 of FIG. 3 is the broadcaster GUI 320. This is an interface through which a user can decide to connect to a third party 168 and select which data from the wearable device 120 should be accessible to the third party 168, shared by the wearable device 120 with the third party 168, or shared by the third party 168 with the wearable device 120. All of this, as well as settings indicating encryption and password-protection, can be indicated by selecting a security level (e.g., exemplary security levels S1-S7 of FIG. 2). An example of this interface is given in FIG. 4.

A third module of the exemplary security module software 142 of FIG. 3 is the notification GUI 315. This is an interface through which a user can decide how the wearable device 120 should notify the user when a third party 168 accesses sensor data (e.g., vibration, message, audio from a speaker, small electric shock), how the wearable device 120 should notify the user if a third party 168 transmits data to the wearable device 120 (e.g., vibration, message, audio from a speaker, small electric shock), whether these notifications should vary based on which third party 168 is performing, whether there should be a delay before notifying the user that a data access or data receipt event has occurred, and whether the wearable device 120 should identify the third party 168 to the user when a data access or data receipt event has occurred (e.g., by a unique vibration for that third party 168, by identifying the third party 168 on the display through text or an image, or by identifying the third party 168 with audio played from a speaker). An example of this interface is given in FIG. 5.

A fourth module of the exemplary security module software 142 of FIG. 3 is the broadcast decision software 320. This software integrates the data entered by the user into the broadcaster GUI 310 and the notification GUI 315 into the wearable device's security database 144. When a third party 168 requests access to data, or data is to be shared by or with the wearable device 120, the broadcast decision software 320 checks the wearable device's security database 144 for this information and decides if the data is to be allowed to be accessed or shared. The broadcast decision software 320 can also perform any other actions that the wearable device 120's security database 144 indicates should be taken, such as encrypting a data file, checking to ensure that a data file is still encrypted, or password-protecting a data file (or prompting the encryption software 305 to perform one or more of these actions.).

A fifth module of the exemplary security module software 142 of FIG. 3 is the security GUI 325. The security GUI 325 may interface with the broadcaster GUI 310 to provide more fine-grained security level customizations for a particular communication or a particular third party 168 (see e.g., the exemplary security GUI 325 of FIG. 5).

A sixth module of the exemplary security module software 142 of FIG. 3 is the edit GUI 330. The edit GUI 330 may be provided at the wearable device 120 for certain types of data that the user is allowed to edit prior to transmission.

A seventh module of the exemplary security module software 142 of FIG. 3 is the security key software 335. The security key software 335 generates and transmits or otherwise exchanges security/encryption keys between the user wearable device 120 or to third parties 168/receiver devices 530 (e.g., mobile device 150, manufacturer/brand 180, trusted 3rd party 170).

In some embodiments, the wearable device 120's security module software 142 includes other modules not depicted in FIG. 3. In some embodiments, one or more of the modules 305-335 may be implemented on another device such as, for example, the mobile device 350 (e.g., in the security module 156 thereof). For example, the instructions defining the various GUIs 310, 315, 325, 330 may be part of the mobile device 350 security module 156 and used to configure the remaining modules 305, 320, 335 of the security module software 142 of the wearable device 120.

Figure 4:
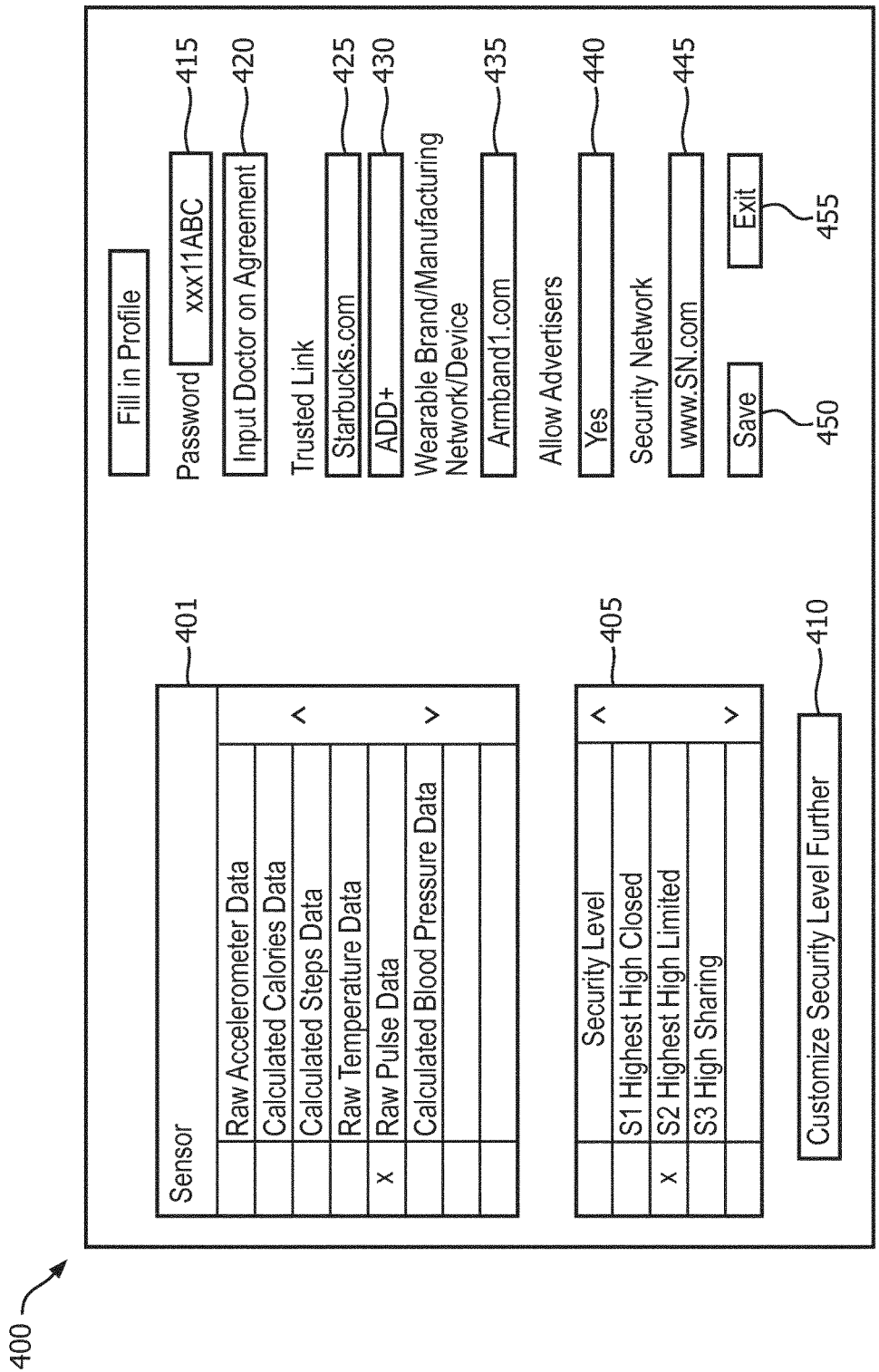
FIG. 4 illustrates an exemplary broadcaster graphical user interface (GUI) of an exemplary wearable device.

FIG. 4 illustrates an exemplary broadcaster graphical user interface (GUI) 400 (which may correspond to GUI 320) of an exemplary wearable device 120 (or mobile device 150). This is an interface through which a user can decide to connect to a third party 168 and select which data from the wearable device 120 should be accessible or transmitted/received by the wearable device 120, and at what security level. The broadcaster GUI 310, or a variant thereof, could also be displayed on a device other than the wearable device 120, such as a user's mobile device 150 (e.g., mobile device 150 device, tablet device, laptop computer, desktop computer) or other device.

In the exemplary broadcaster GUI 400 of FIG. 4, various sensor measurement data categories and various sensor-based calculated data categories are shown in a "Sensor" menu 401 on the left-hand side. For example, the exemplary broadcaster GUI 310 sensor menu 401 shows various sensors including raw accelerometer data, calculated calories burned data, raw pulse data, calculated blood pressure data, and other measurements. A difference can be indicated between "raw" and "calculated" data—for instance, "raw accelerometer data" is the raw data from the wearable device's accelerometers, whereas the "calculated calories data" may be a number of burned calories that has been calculated from the accelerometer data. Similarly the "calculated steps data" may be calculated from the accelerometer data, and "calculated blood pressure data" may be calculated from the raw pulse data. Accordingly, in some embodiments, the user may indicate that, generally, raw data and calculated should be treated differently (e.g., different security levels). In some embodiments, the wearable device may not calculate one or more of these calculated parameters The exemplary broadcaster GUI 400 of FIG. 4 also includes a "Security level" menu 405, which includes at least "S1—Highest High Closed", "S2—Highest High Limited," and "S3—High Sharing" among its listed security levels. These security levels may be the same as, or similar to, the exemplary security levels listed in the exemplary security level listing of FIG. 2. If a user wishes to customize their security level further, a "customize security level further" button 410 may take the user to a security GUI 325 (see e.g., exemplary security GUI 325 of FIG. 5).

The data currently within the exemplary broadcaster GUI 400 of FIG. 4 further indicates that the user has connected to third party 168 "Starbucks.com" (see "trusted link" interface element 425) and allowed this third party access to raw pulse data (see "sensor" menu 401 with "raw pulse data" selected) at the S2 security level (see "security level" menu 405 with "S2—Highest High Limited" selected). An "ADD+" button 430 allows the user of the exemplary broadcaster GUI 310 to add a second third party 168 (besides "Starbucks.com") to these "Trusted Link" settings 425, so that the second third party can also access the raw pulse data (see "sensor" menu 401 with "raw pulse data" selected) at the S2 security level (see "security level" menu 405 with "S2—Highest High Limited" selected). The user has further given a password 415 that the third party 168 will need to input in order to obtain this raw pulse data. The third party 168 indicated in the "trusted link" setting 425 may be the third party network/device 170. The user can also indicate a wearable brand/manufacturer network/device 180 that may also receive the raw pulse data (see "sensor" menu 401 with "raw pulse data" selected) at the S2 security level (see "security level" menu 405 with "S2—Highest High Limited" selected). The user can also indicate a security network 160 that may ensure the security of these transactions (e.g., by receiving and transmitting only encrypted data where the wearable device and third parties have the decryption keys). In some embodiments, the security network 160 may also receive the raw pulse data (see "sensor" menu 401 with "raw pulse data" selected) at the S2 security level (see "security level" menu 405 with "S2—Highest High Limited" selected).

In the exemplary broadcaster GUI 400 of FIG. 4, this wearable brand/manufacturer network/device 180 is identified as "Armband1.com," (see wearable brand/manufacturer network/device setting 435) and the security network 160 is identified as "www.SN.com," (see security network setting 445) and the password that each third party 146 must enter to read the raw pulse data is identified as "xxx11ABC" (see password setting 415). The user has also elected to allow advertisers (see "allow advertisers" setting 440), and thus, the user's wearable device 120 may, for example, receive coupons from third party network 170 "Starbucks.com," for example when passing near a Starbucks coffee shop. The user has also indicated "Input doctor on agreement," (see doctor setting 420) indicating that the user's doctor may also receive this raw pulse data at S2 security level if the doctor agrees. The user may save these settings through a save button 450 or exit the broadcaster GUI 400 through an exit button 455.

In some embodiments, specific types of communications (e.g., communications to/from the wearable device's manufacturer, or communications to/from a doctor) may be allocated a default security level (e.g., any one of S1-S7) so that the user does not have to manually input every third party into the broadcaster GUI.

In various embodiments, upon selection of the save button 450, the entered data is committed as one or more security policies (or portions of one or more security policies). Thereafter, the same interface 400 may be used to further modify the one or more security policies. For example, without changing the options committed for raw pulse data, the user may use the GUI 400 to set the calculated blood pressure data and calculated calories data to security level S1.

Figure 5:
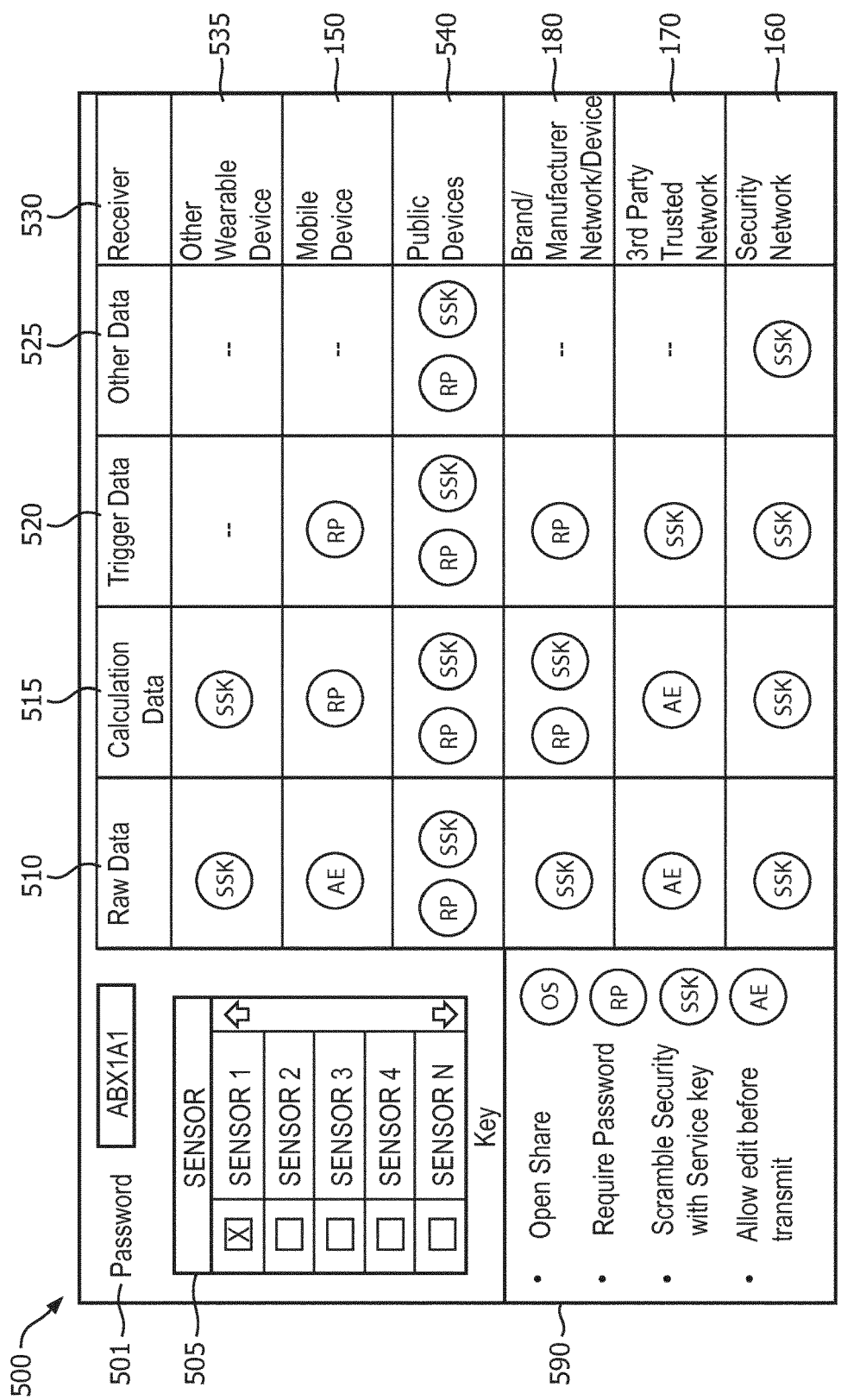
FIG. 5 illustrates an exemplary security GUI of an exemplary wearable device.

FIG. 5 illustrates an exemplary security GUI 500 (which may correspond to GUI 325) of an exemplary wearable device 120 (or other device). The exemplary security GUI 500 of FIG. 5 can be used by the user to perform a number of actions. For example, the user may indicate a password that must be entered by a third party 168 before accessing the wearable device 120's data (see "password" setting 501), select one or more sensors to use (see "sensors" menu 505 with "sensor 1" of sensors 1-N selected).

The user may also select security settings corresponding to one or more types of data from the one or more sensors (of sensors 130) selected in sensor menu 505. Namely, the user may select various security settings (explained by "Key" 590 as "open share," "require password," "scramble security with service key," and "allow edit before transmit") corresponding to raw sensor data 510 (e.g., raw blood pressure data), calculation data 515 (e.g., calorie calculations based on the blood pressure data), trigger data 520 (e.g., data describing conditions for "triggering" a user alert, such as a speaker sound or vibration or displayed text/graphic/video, indicating that one or more predetermined sensor measurement limit(s) have been exceeded or that sensor measurements have fallen outside of one or more predetermined sensor measurement range(s), perhaps indicating a health condition), or other data 525. These security settings may further be altered depending on what network or device is receiving the data (see "Receiver" column 530), which may include other wearable devices 535, a mobile device 150, a public device 540 (e.g., a point of sale device at a store), a brand/manufacturer network/device 180, a third-party trusted network/device 170, or a security network 160.

With each type of data, the exemplary security GUI 500 of FIG. 5 may associate one or more different types of security measures to make secure the particular user data stored in the wearable device. As illustrated in key 590 of FIG. 5, the different types of security measures may include open share (OS), password required (RP), and scrambled security with a service key (SSK). FIG. 5 also illustrates an option that allows edits to the associated data before it gets transmitted (AE). It should be noted that there may be other security measures and options that may be incorporated in other embodiments of the present disclosure.

Figure 7:
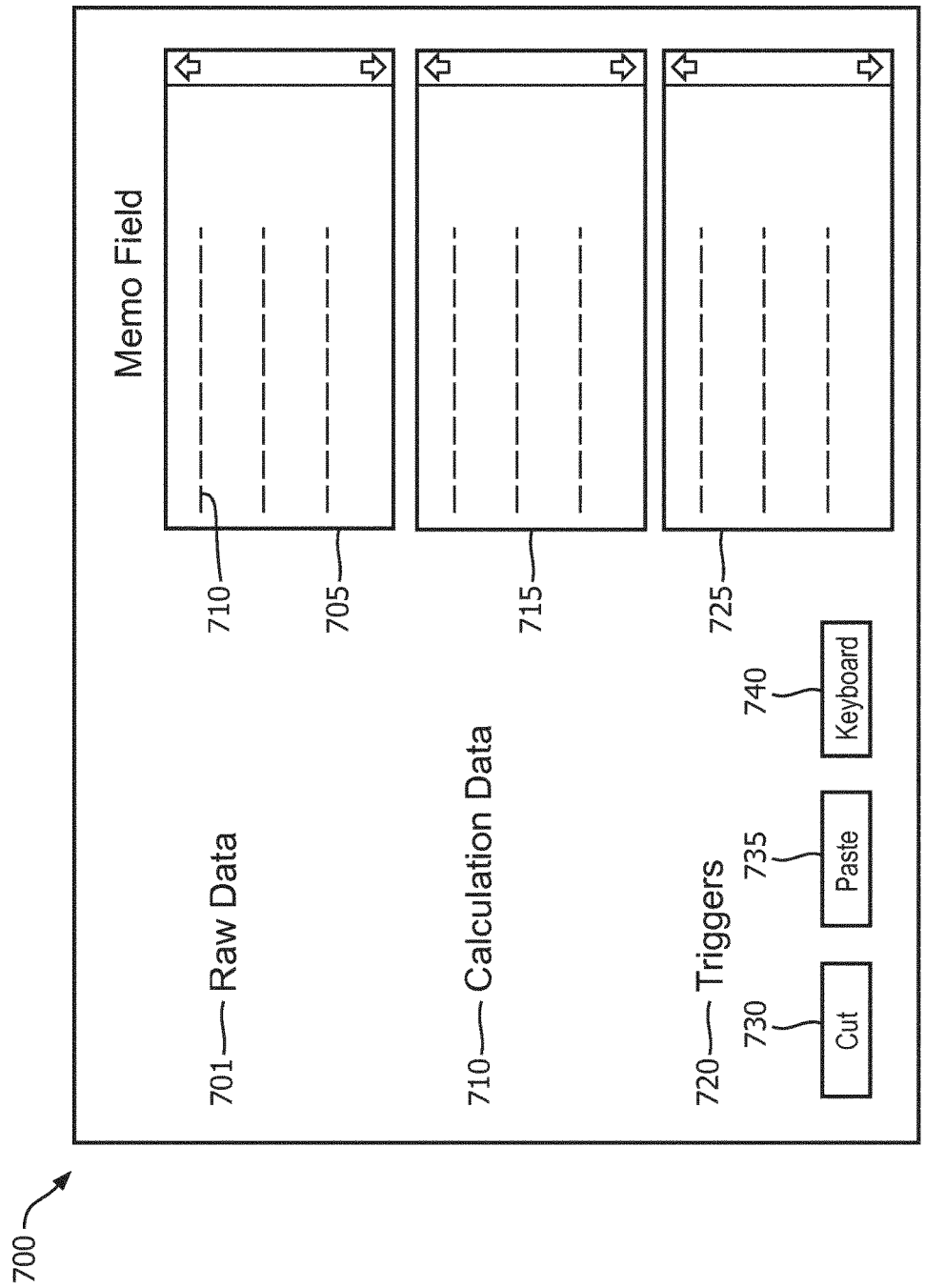
FIG. 7 illustrates an exemplary edit GUI of an exemplary wearable device.

In one embodiment, if the user desires to send raw sensor data 510 from the wearable device 120 to a mobile device 150 and associates the ability to make edits before sending out the data ("AE"), this may bring up the edit GUI (described in further detail in FIG. 7). The edit GUI may allow the user to edit the raw data prior to transmission to the mobile device 150 or other "receiver" network or device (such as the other exemplary "receiver" networks/devices in column 530). In another embodiment, if the data is associated with scramble security with service key, the security network 160 may be instructed to provide secure key to access the scrambled data. In another embodiment, if the data is associated with open share, this may indicate that no security is associated with this particular set of data. The "require password" security indicator ("RP") may indicate that the third party 168 or receiver 530 needs to input the password identified in the "password" setting 501 in order to access the data, or, alternately, may require the user to input the password identified in the "password" setting 501 into the wearable device to agree whenever a the third party 168 or receiver 530 wishes to access data.

Figure 6:
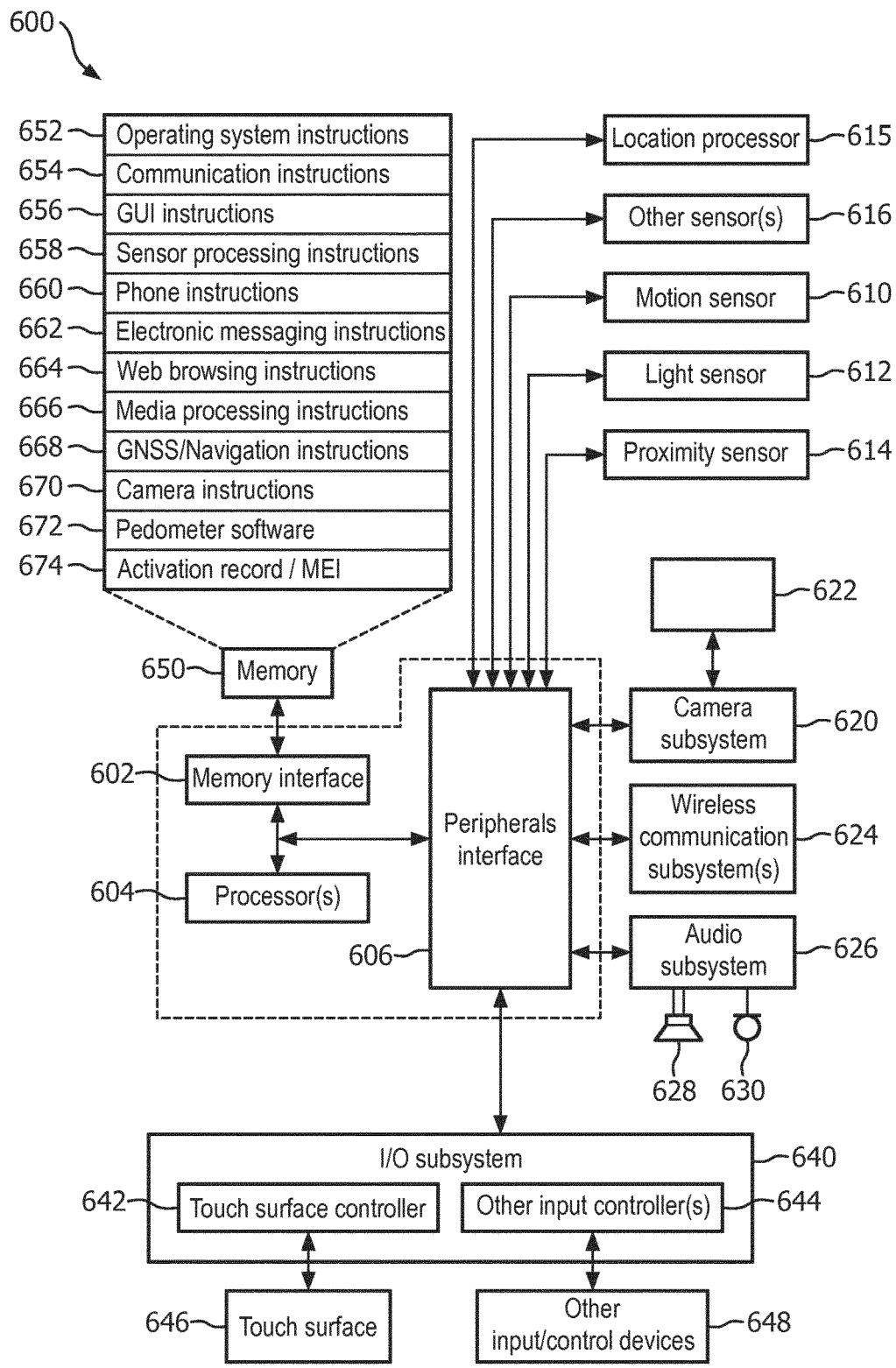
FIG. 6 illustrates an exemplary computing device architecture that may be utilized to implement the various features and processes described herein.

FIG. 6 illustrates an exemplary computing device architecture that may be utilized to implement the various features and processes described herein. For example, the computing device architecture 600 could be implemented in the wearable device or the IOT device. Architecture 600 as illustrated in FIG. 6 includes memory interface 602, processors 604, and peripheral interface 606. Memory interface 602, processors 604 and peripherals interface 606 can be separate components or can be integrated as a part of one or more integrated circuits. The various components can be coupled by one or more communication buses or signal lines.

Processors 604 as illustrated in FIG. 6 is meant to be inclusive of data processors, image processors, central processing unit, or any variety of multi-core processing devices. Any variety of sensors, external devices, and external subsystems can be coupled to peripherals interface 606 to facilitate any number of functionalities within the architecture 600 of the exemplar mobile device. For example, motion sensor 610, light sensor 612, and proximity sensor 614 can be coupled to peripherals interface 606 to facilitate orientation, lighting, and proximity functions of the mobile device. For example, light sensor 612 could be utilized to facilitate adjusting the brightness of touch surface 646. Motion sensor 610, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 606, such as a temperature sensor, a biometric sensor, or other sensing device to facilitate corresponding functionalities. Location processor 615 (e.g., a global positioning transceiver) can be coupled to peripherals interface 606 to allow for generation of geo-location data thereby facilitating geo-positioning. An electronic magnetometer 616 such as an integrated circuit chip could in turn be connected to peripherals interface 606 to provide data related to the direction of true magnetic North whereby the mobile device could enjoy compass or directional functionality. Camera subsystem 620 and an optical sensor 622 such as a charged coupled device (CCD) or a complementary metal-oxide semiconductor (CMOS) optical sensor can facilitate camera functions such as recording photographs and video clips.

Communication functionality can be facilitated through one or more communication subsystems 624, which may include one or more wireless communication subsystems. Wireless communication subsystems 624 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 624 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 624 may include hosting protocols such that the device may be configured as a base station for other wireless devices. Communication subsystems can also allow the device to synchronize with a host device using one or more protocols such as TCP/IP, HTTP, or UDP.

Audio subsystem 626 can be coupled to a speaker 628 and one or more microphones 630 to facilitate voice-enabled functions. These functions might include voice recognition, voice replication, or digital recording. Audio subsystem 626 in conjunction may also encompass traditional telephony functions.

I/O subsystem 640 may include touch controller 642 and/or other input controller(s) 644. Touch controller 642 can be coupled to a touch surface 646. Touch surface 646 and touch controller 642 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 646 may likewise be utilized. In one implementation, touch surface 646 can display virtual or soft buttons and a virtual keyboard, which can be used as an input/output device by the user.

Other input controllers 644 can be coupled to other input/control devices 648 such as one or more buttons, rocker switches, thumb-wheels, infrared ports, USB ports, and/or a pointer device such as a stylus. The one or more buttons (not shown) can include an up/down button for volume control of speaker 628 and/or microphone 630. In some implementations, device 600 can include the functionality of an audio and/or video playback or recording device and may include a pin connector for tethering to other devices.

Memory interface 602 can be coupled to memory 650. Memory 650 can include high-speed random access memory or non-volatile memory such as magnetic disk storage devices, optical storage devices, or flash memory. Memory 650 can store operating system 652, such as Darwin, RTXC, LINUX, UNIX, OS X, ANDROID, WINDOWS, or an embedded operating system such as VxWorks. Operating system 652 may include instructions for handling basic system services and for performing hardware dependent tasks. In some implementations, operating system 652 can include a kernel.

Memory 650 may also store communication instructions 654 to facilitate communicating with other mobile computing devices or servers. Communication instructions 654 can also be used to select an operational mode or communication medium for use by the device based on a geographic location, which could be obtained by the GPS/Navigation instructions 668. Memory 650 may include graphical user interface instructions 656 to facilitate graphic user interface processing such as the generation of an interface; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes, camera instructions 670 to facilitate camera-related processes and functions; pedometer software 672 to facilitate pedometer related functions such as calculating a step count from accelerometer data; activation record/IMEI 674 for uniquely identifying the device 600 to other devices such as a carrier network; and instructions for any other application that may be operating on or in conjunction with the mobile computing device. Memory 650 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 650 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

FIG. 7 illustrates an exemplary edit GUI 700 (which may correspond to GUI 330) of an exemplary wearable device 120 (or other device). In particular, the exemplary edit GUI 700 of FIG. 7 may allow a user or recipient (e.g., a "receiver" 530) to view data obtained from the one or more sensors 130 of the user wearable device 120, such as raw data 701, calculated data 710, or trigger data 720. The data may be viewed or edited on the right side of the exemplary edit GUI 330 of FIG. 7 in memo fields (e.g., raw data memo field 705, calculated data memo field 715, trigger data memo field 725). The exemplary edit GUI 700 of FIG. 7 also provides editing functions to aid in editing the memo fields (e.g., "cut" 730 and "paste" 735, input through a keyboard/touchscreen 740, cursor 750). The data may be added, deleted or otherwise modified as the user desires.

Figure 8:
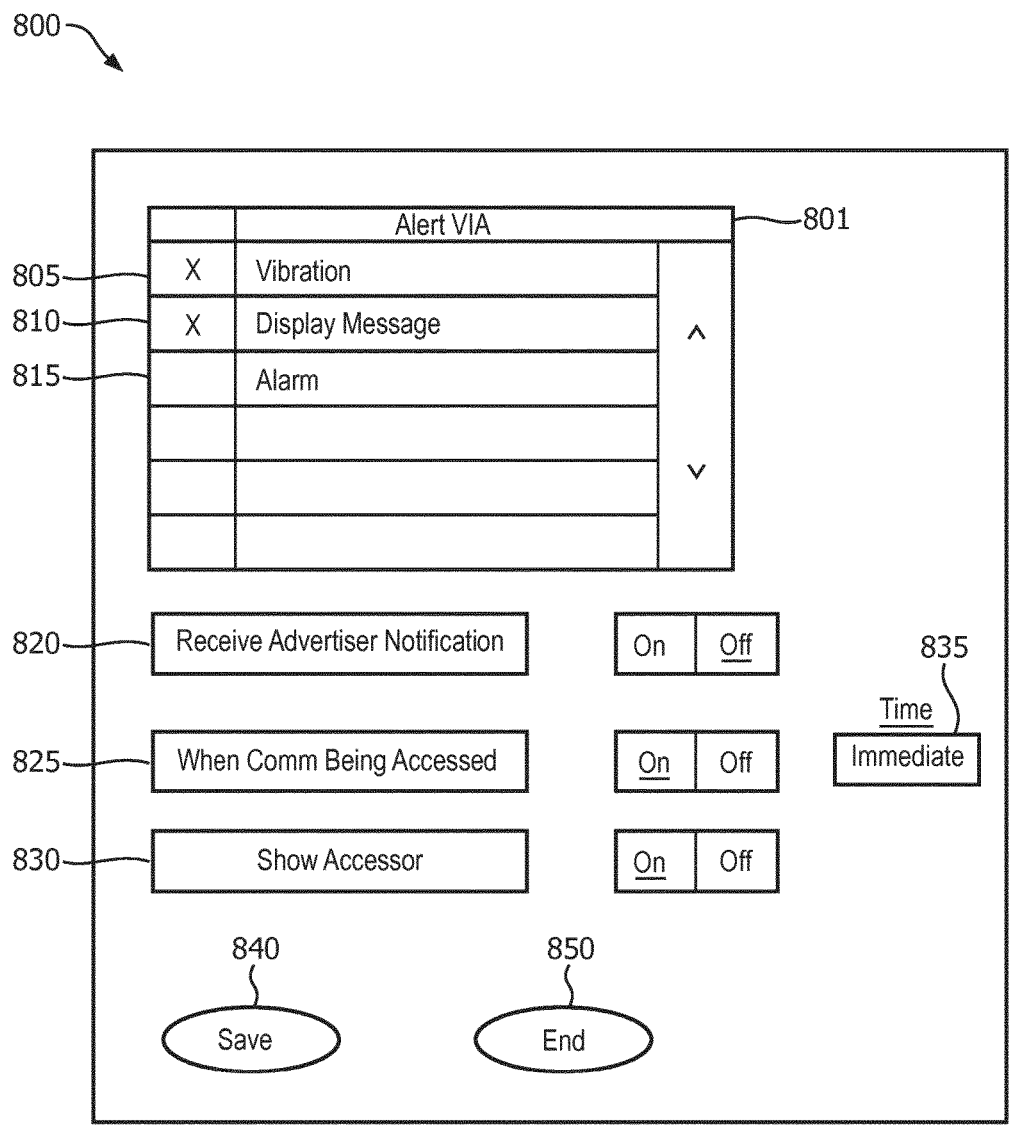
FIG. 8 illustrates an exemplary notification GUI of an exemplary wearable device.

FIG. 8 illustrates an exemplary notification GUI 800 (which may correspond to GUI 315) of an exemplary wearable device 120 (or other device). This is an interface through which a user can decide, through a "Alert Via" menu 801, how the wearable device 120 should notify the user when a third party 168 or receiver 530 receives or otherwise accesses sensor data (e.g., vibration 805, displayed message 810, audio alarm from a speaker 815, small electric shock, or other type of notification), how the wearable device should notify the user if a third party transmits data to the wearable device (e.g., vibration 805, displayed message 810, audio alarm from a speaker 815, small electric shock, or other type of notification).

The user may, using the exemplary notification GUI 800 of FIG. 8, also adjust whether these notifications should vary based on which third party 168/receiver 530 is accessing/receiving data (e.g., if the third party 168/receiver 530 is an advertiser according to "receive advertiser notification" settings 820), whether there should be a delay before notifying the user that a data access or data receipt event has occurred (see "time" setting 835 associated with "when comm being accessed" setting 825), and whether the wearable device should identify the third party to the user when a data access or data receipt event has occurred (see "show accessor" setting 830) (e.g., by a unique vibration for that third party, by identifying the third party on the display through text or an image, or by identifying the third party with audio played from a speaker).

For example, in the exemplary notification GUI 800 of FIG. 8, the user has indicated that he would like to receive notifications via vibration and a displayed message, but not via an alarm. The user has also elected not to receive advertiser notifications, to immediately receive notifications when communications are being accessed, and to identify the accessing third party. Other settings can be chosen for other third parties 168/receivers 530 or for other sensor data sets.

Figure 9:
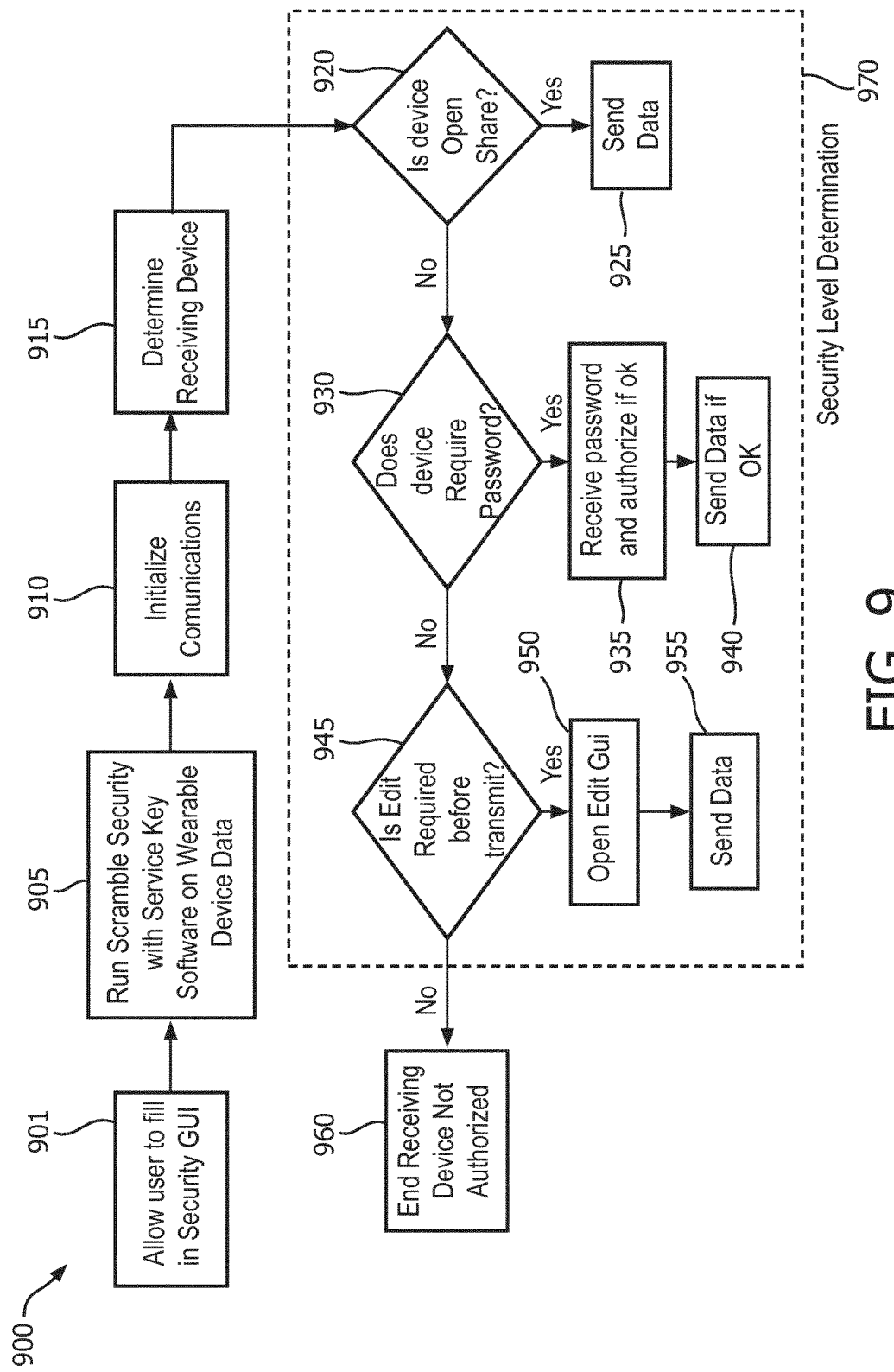
FIG. 9 is a flow chart illustrating exemplary operations by an exemplary security module software of an exemplary wearable device.

FIG. 9 is a flow chart 900 illustrating exemplary operations by security module software such as exemplary security module software 142 of an exemplary wearable device 120 or, in some embodiments, the security module 156 of mobile device 150. The method 900 of FIG. 9 may be used for a number of functionalities, such as to receive user input information through the broadcaster GUI 310 and/or the security GUI 325 (step 901). The method 900 of FIG. 9 may also be used for running scrambled security with service key software 335 on data stored in the wearable device 120 (e.g., at wearable sensor database 146) (or elsewhere such as a mobile phone or wearable device management framework) (step 905). It should be noted that the scrambled security feature of the service key software 335 may be used to prevent the data from being hacked. In particular, the data may appear scrambled and unreadable (e.g., encrypted) unless the user or another process provides a key to unscramble the data.

The method 900 may also unify and initialize communications being provided from the user wearable device to third parties 168/receiver devices/networks 530, as well as communications coming from third parties 168 (step 910). If the second device in the communication is a receiving device/network 530, then part of this process is identifying the receiving device 530 (step 915). In particular, the security module software 142 may determine what type of security level is associated with the transmitted data of the wearable device with that receiving device 530 (e.g., what security level has been selected by the user through the broadcaster GUI 310 and/or the security GUI 325) (see security level determination 970). In particular, the method 900 may check whether the receiving device/network 530 and/or data to be sent is associated with an "open sharing" policy (e.g., security level S7 of the exemplary security level listing of FIG. 2) (step 920), and if so, send the data (step 925). If not, the method 900 may check whether the receiving device/network 530 and/or data to be sent is associated with password requirement (step 935), and if so, may receive a password, authorize the received password (step 935), and send the data if the password was authorized successfully (step 940). If not, the method 900 may check whether the receiving device/network 530 and/or data to be sent is associated with an "edit before transmit" policy (step 945), and if so, may open an edit GUI 330 to allow the user of the wearable device to edit the data (step 950) before transmitting it (step 955). If none of these security level policies 970 apply, then the method 900 may ultimately decide that the receiving device/network 530 is not authorized to receive the data in question, and may terminate the transmission (step 960).

An encryption or other data scrambling feature may be provided as an added level of security that the receiving device/network 530 and any malicious party or snooper may encounter in trying to read the data from the wearable device 120. Even after determining proper authorization (e.g., password) or opening the appropriate GUI (e.g, edit GUI 330), a corresponding security key from the user wearable device 120 may be required to unscramble the data and properly interpret what was being sent by the user wearable device 120. The security module software 142 may be necessary to access the appropriate security key from the user wearable device 120 and/or from the security network 160. The data may then either be decrypted at the security network 160 and sent to/accessed by the receiving device/network 530, or the receiving device/network 530 may receive the security key either directly from the wearable device 120 or by proxy from the security network 160 for this purpose.

Figure 10:
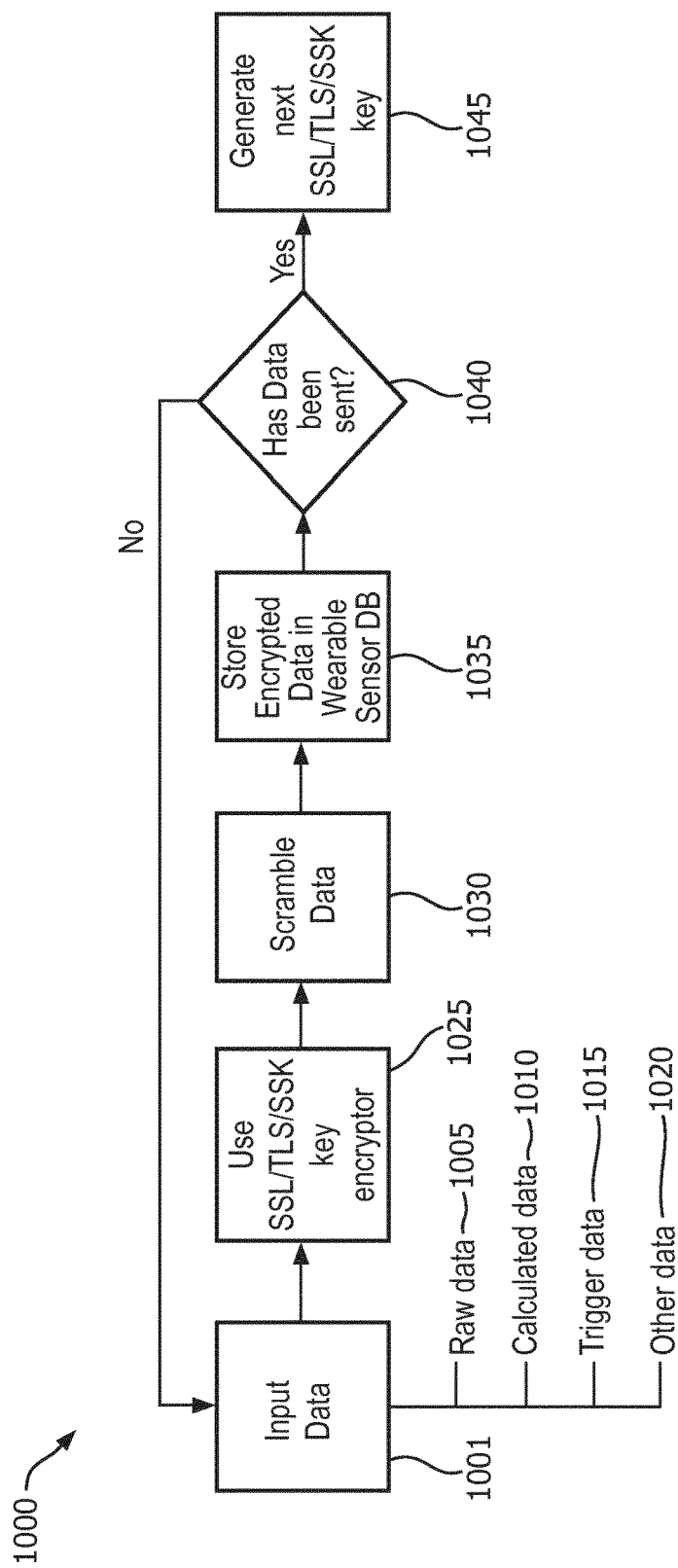
FIG. 10 is a flow chart illustrating exemplary operations by an exemplary security key software of an exemplary wearable device.

FIG. 10 is a flow chart illustrating a method 1000 for performing exemplary operations by an exemplary security key software 335 of an exemplary wearable device 120 (or other device).

In particular, as illustrated in the figure, the method 1000 may first receive an input of any type of data (e.g., raw data 1005, calculated data 1010, trigger data 1015, and other data 1020) (step 1001) to be transmitted to a receiving device/network 530. The data, once inputted, can then be associated with a security system key used to encrypt the data, such as a Secure Sockets Layer (SSL) or Transport Layer Security (TLS) session key (step 1025). There may be many different ways or algorithms used to encrypt the data. The encryption results in the scrambling of the data that makes unauthorized parties without the encryption key unable to interpret and read the data properly (step 1030).

Once the data from the wearable device is scrambled, the data may then be stored, encrypted in the wearable sensor database 146 and/or the security database 144 (which may also store the security system keys) found on the wearable device 120 (step 1035). A corresponding key is then associated with the stored data that can then be sent out to one or more receiver devices so that they may be able to unscramble the data properly (step 1035). Once the data has been sent (step 1040), a new security key can be generated (step 1045) in order to prevent unauthorized parties from gaining access to the data.

Figure 11:
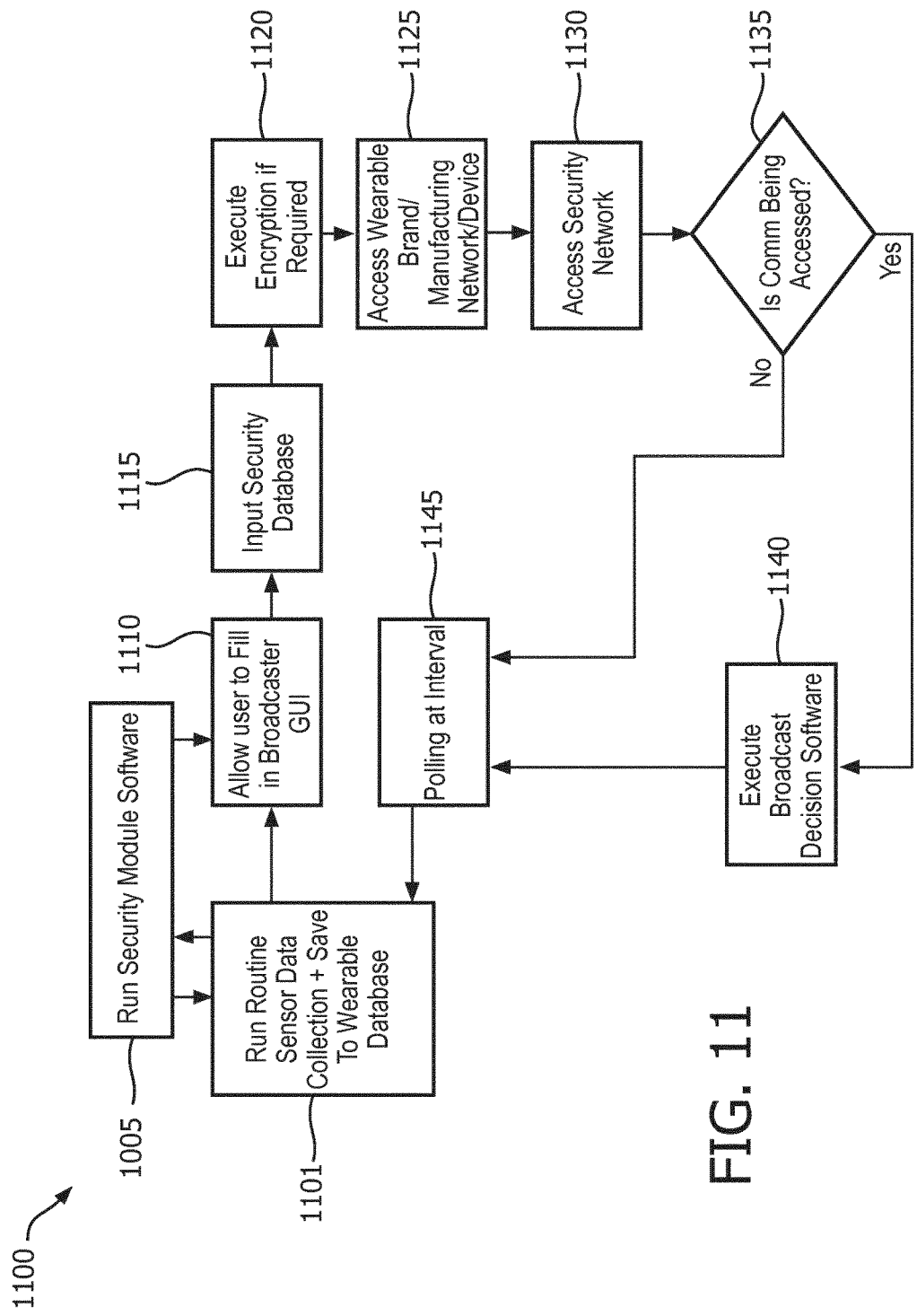
FIG. 11 is a flow diagram illustrating exemplary operations executed by the wearable device base software.

FIG. 11 is a flow diagram illustrating an exemplary method 1100 for performing operations executed by the wearable device 120 base software 140. The flow diagram illustrates the wearable device 120 first running routine sensor data collection via sensors 130, and saving this data to the wearable device 120's wearable sensor database 146 (step 1101). At this point, the method 1100 may run the security module software 142 (step 1105). The user, through wearable device 120, then may bring up the broadcaster GUI 310 and/or security GUI 335 and fill it in with a third party 168 identifier and the third party's security level permissions (step 1110). The third party 168 information and security level settings are then input into the wearable device 120's security database 144 (step 1115). If the information filled in to the broadcaster GUI 310 and/or security GUI 335 indicates that a particular set of sensor measurement or sensor-calculated data is to be encrypted (e.g., security level S1 or S2), then it may be done at this stage (step 1120). The wearable device can then access the wearable brand/manufacturer network/device 180 (step 1125) and the security network 160 (step 1130). In some embodiments, the security network 160 should be accessed first, and may assist in identifying or providing data to the wearable brand/manufacturer network/device 180. In some embodiments, user device 150 and/or trusted third party network/device 170 may also be accessed (not shown). These networks/devices may be accessed in order to transfer data, or in some cases may serve as an additional security layer by identifying other third party receiver devices/networks 530. For instance, these networks/devices may in some embodiments be accessed to (a) check if the third party is identified in these networks' databases in order to see if others have identified them as "safe" third parties, or (b) back up the wearable device's broadcaster database entry for other this wearable device, or other wearable devices, or even other users to be allowed to access. The third party may similarly access the wearable brand network and the security network to ensure that other third parties have recognized the wearable device and the user as "safe" to connect with.

Once this has been completed, the wearable device 120 and third party 168 are ready to connect. If the communication module 132 of the wearable device 120 is not being accessed or queried (step 135), then it may return to polling sensor data and routine operations periodically (step 1145). If the communication module of the wearable device 120 is accessed or queried (step 1135), it may execute the wearable device 120's broadcast decision software 320 (step 1140), an example of which is described further in FIG. 12.

While the flow diagram in FIG. 11 (and respective flow diagrams of other figures) shows a particular order of operations performed by certain embodiments, it should be understood that such order is exemplary (e.g., alternative embodiments can perform the operations in a different order, combine certain operations, overlap certain operations, execute operations or methods in parallel etc.).

Figure 12:
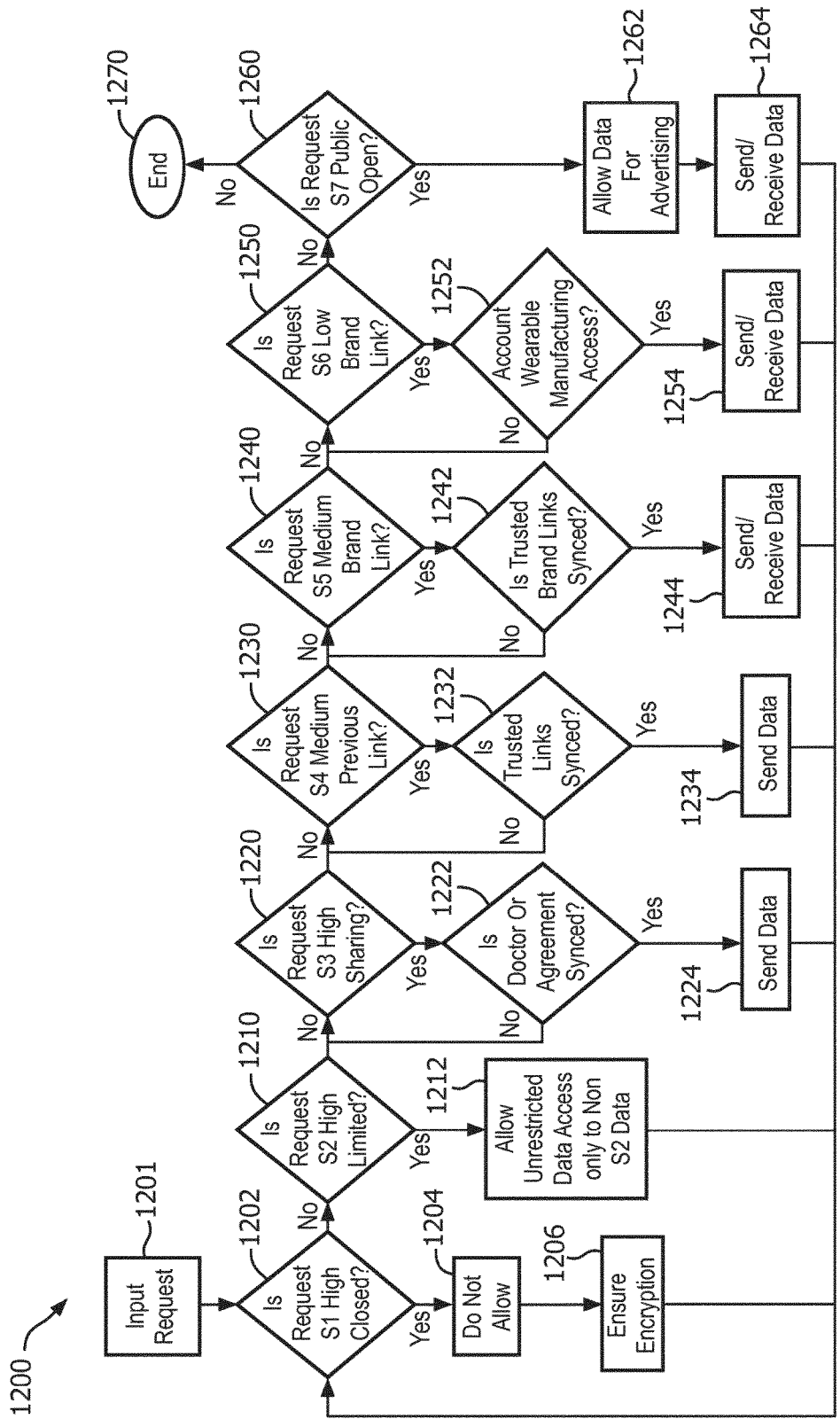
FIG. 12 is a flow diagram illustrating exemplary operations executed by the wearable device broadcast decision software.

FIG. 12 is a flow diagram illustrating an example of a method 1200 for performing exemplary operations executed by the wearable device 120 (or other device) broadcast decision software 320. The flow diagram of FIG. 12 begins with the method 1200 receiving a request for information to be shared or accessed from the wearable device 120's wearable database 146, where it keeps its sensor measurements and sensor calculations (step 1201). The method 1200 then checks what security level was chosen for the data in question through the broadcaster GUI 310 and/or security GUI 325.

The method 1200 specifically enforces the exemplary security levels list of FIG. 2, using the exemplary classifications for what each security level is intended to cover. Various modifications for other security schemes will be apparent. If the information requests data that is classified S1 (step 1202)—then the method 1200 does not send it out (step 1204), and in one embodiment, may use this request as an opportunity to double-check that the data in question is stored encrypted as it should be (step 1206). If the requested data is classified S2 (step 1210), then unrestricted access is given only to data that does not fall under the protection of the S2 classification (step 1212). If the requested data is classified S3 (step 1220), then the data can be sent (step 1224) if a doctor's agreement has been synced (step 1222). If the requested data is classified S4 (step 1230), then the data can be sent (step 1234) if a trusted link has been synched (step 1232). If the requested data is classified S5 (step 1240), then the data can be sent and data can be received (step 1244) if a trusted brand link has been synched (step 1242). If the requested data is classified S6 (step 1250), then the data can be sent and data can be received (step 1254) if the third party is the wearable brand/manufacturer network/device 180 (step 1252). If the requested data is classified S7 (step 1260), then the data can be sent and data can be received openly and publicly (step 1264) as long as the data involved is used for advertising (step 1262).

While the flow diagram in FIG. 12 shows a particular order of operations performed by certain embodiments, it should be understood that such order is exemplary (e.g., alternative embodiments can perform the operations in a different order, combine certain operations, overlap certain operations, etc.).

Figure 13:
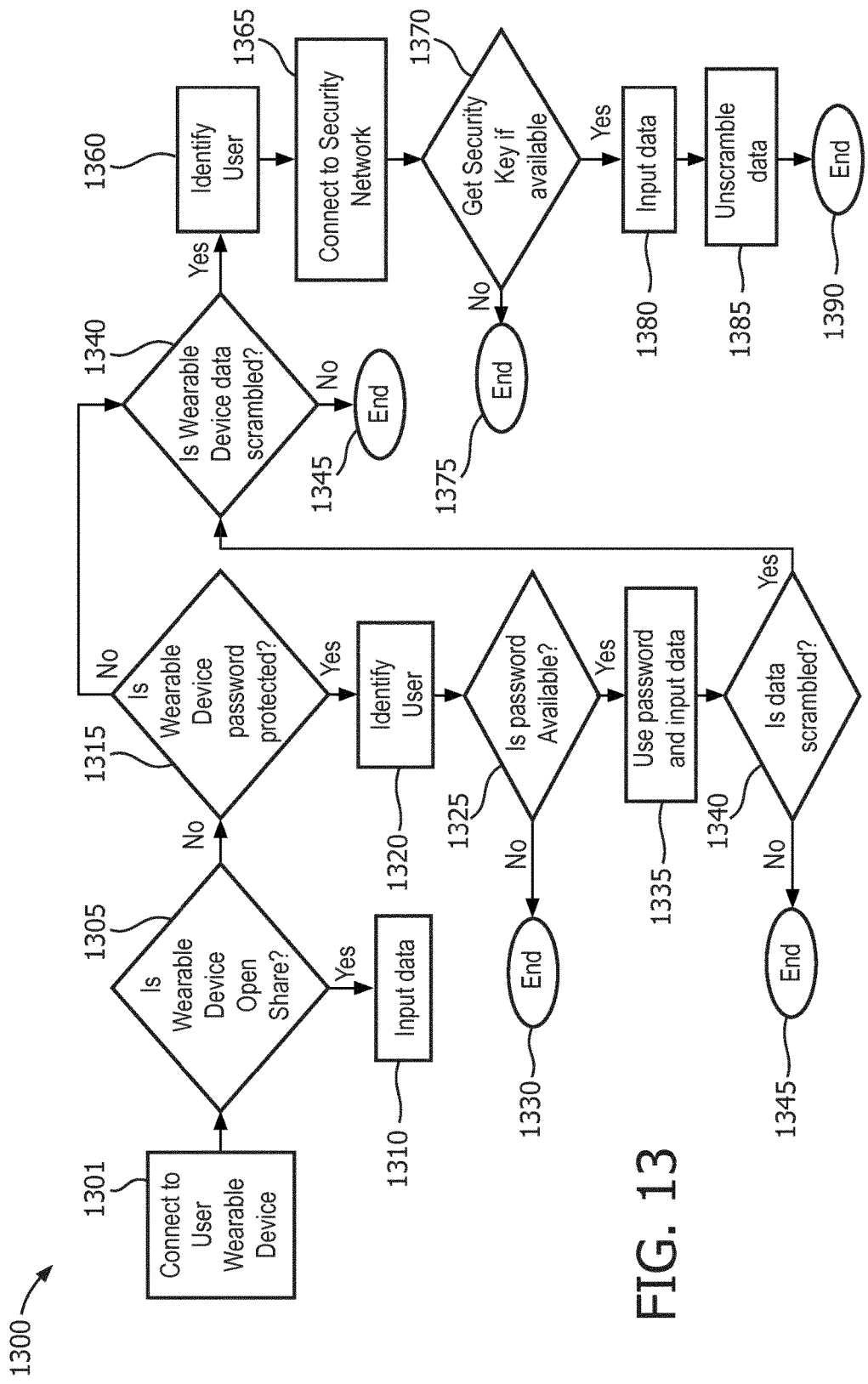
FIG. 13 is a flow diagram illustrating exemplary operations executed by an exemplary security module software of an exemplary mobile device, an exemplary security module software of an exemplary third party trusted network/device, or an exemplary security module software of an exemplary wearable brand/manufacturer network/device.

FIG. 13 is a flow diagram illustrating an example of a method 1300 for performing exemplary operations executed by an exemplary security module software 154 of an exemplary mobile device 150, an exemplary security module software 174 of an exemplary third party trusted network/device 170, or an exemplary security module software 184 of an exemplary wearable brand/manufacturer network/device 180.

Once a corresponding third party 168/receiver device/network 530 (e.g., mobile device 150, manufacturer/brand 180, trusted $3^{rd}$ party 170) is connected with the user wearable device 120 (step 1301), the method 1300 for that particular receiver device/network 530 can be used to evaluate the security level for a corresponding data that is being transmitted from the user wearable device 120. If the data's security level is determined to be an "open share" security level (e.g., exemplary security level S7 of the exemplary security level list of FIG. 2) (step 1305), the security module may input the data directly from the wearable device 120 to the particular receiver device 530 (step 1310).

If the data is password protected (step 1315), the method 1300 may identify the appropriate password needed (step 1320) and determine if the particular receiver device 530 is authorized to have access to the data based on its attempted input of the password (step 1325), terminating the connection if the receiver device 530 fails (step 1330). After the password security has been overcome (step 1335), the security module can then determine if the data has been scrambled/encrypted (step 1340). If the data is not scrambled/encrypted, the method 1300 may then input the data from the user wearable device 120 to the particular receiver device (step 1345). If the data is determined to be scrambled/encrypted (step 1340), then the security module may identify the user of the wearable device 120 (step 1360), connect to the security network 160 (step 1365), and retrieve the appropriate security key if it is available (step 1370). The security key may be retrieved either from the security network 160, from the wearable device 120, or from another trusted device, such as the brand/manufacturer 180, the mobile device 160, or a trusted third party 170. If the security key is unavailable, the data from the wearable device cannot be decrypted/unscrambled and the process is terminated without data retrieval (step 1375). If the security key is available (step 1370), the receiver device 530 may retrieve the data and input it into a memory or storage data structure (e.g., 3$^{rd}$ party database 172, brand/manufacturer database 182, memory 156 of mobile device 150) (step 1380), where it may be unscrambled/decrypted further using the security key (step 1385), thus ending the data retrieval process for the receiver device 530 (step 1390).

Figure 14A:
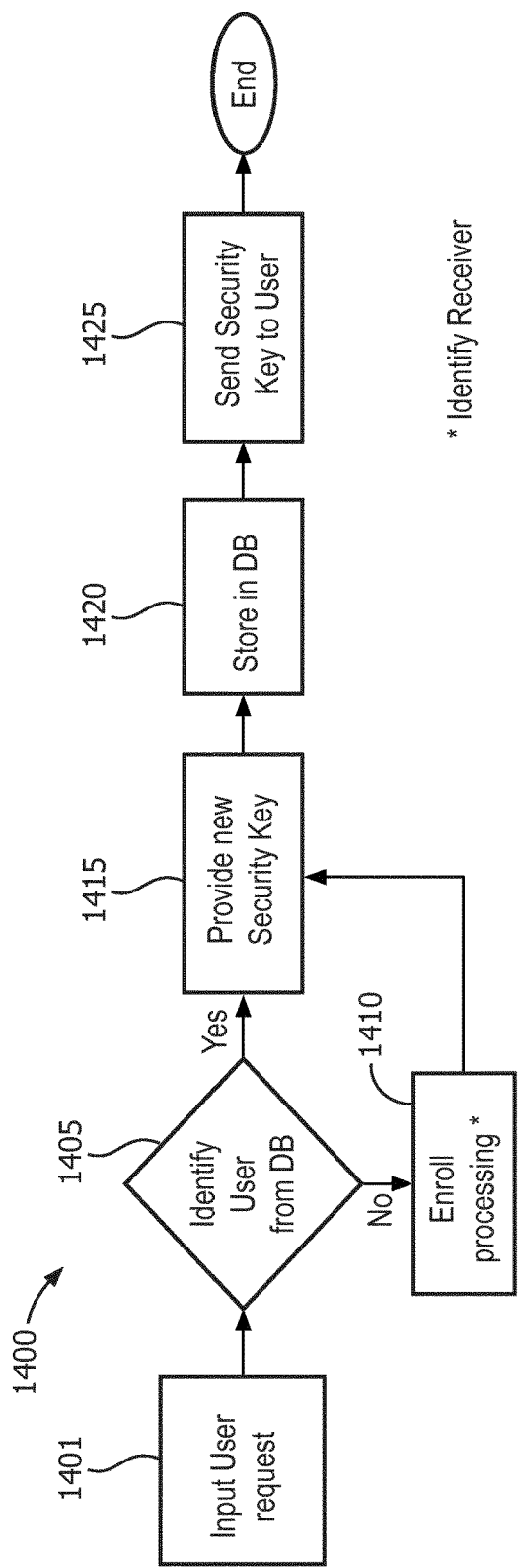
FIG. 14A is a flow diagram illustrating exemplary user security key operations of an exemplary security module of an exemplary security network.

FIG. 14A is a flow diagram illustrating an example of a method 1400 for performing exemplary user security key operations of an exemplary security module 164 of an exemplary security network 160 (or other device such as, in some embodiments, the mobile device 150 or wearable device 120).

The method 1400 may begin with the user of the wearable device 120 first providing an input user request to the security module (step 1401). The security module can then identify the user wearable device and check to see if the particular user is identified in the security network database 162 (step 1405). If the user is not identified, the method 1400 may add/enroll the user of the wearable device 120 into the security network database 162 (step 1410). The database in the security network 160 may also be used by the receiver devices to identify appropriate keys from corresponding user wearable devices since the database may include many different user identifications and their corresponding security keys used to unscramble any number of data sent.

Once the user has been enrolled in the security network database 162 of the security network 160, the method 1400 can then generate a new security key for the wearable device 120 (step 1415). The security network 160 may store the security key in the security network database 162 (step 1420). The method 1400 may transmit the security key to the wearable device 120 (step 1425), where the wearable device 120 may store the security key in the security database 144.

Figure 14B:
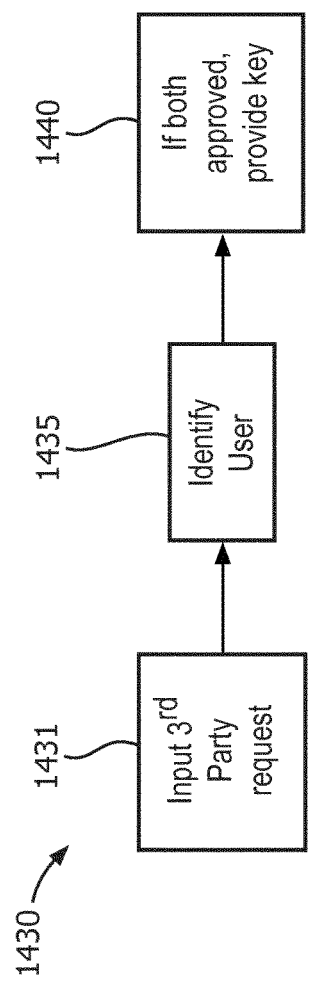
FIG. 14B is a flow diagram illustrating exemplary third party security key operations of an exemplary security module of an exemplary security network.

FIG. 14B is a flow diagram illustrating an example of a method 1430 for performing exemplary third party security key operations of an exemplary security module 164 of an exemplary security network 160.

For receiver devices 530 (e.g., 3$^{rd}$ party networks 170, brand/manufacturer networks/devices 180, mobile devices 150), the security key can be requested by the receiver devices 530 either from the security network 160 or directly from the user wearable device 120. In situations where a receiver device 530 is requesting the security key from the security network 160 (step 1431), the receiver device 530 may, in its request, identify of the user whose wearable device 120 is associated with the encrypted/scrambled data that the receiver device 530 has received (step 1435). At this point, the security network 160 may determine if the user of the wearable device 120 is identified in the security network database 162. The security network database 162 (and/or alternately the security database 144 of the wearable device 120) may also store trusted third parties 168/receiver devices 530 as well (e.g., third parties 146/receiver devices 530 identified in the broadcaster GUI 310 and/or the security GUI 325). The security network 160 can thus check to ensure that the user is identified in the security network database 162 and the recipient device 530 is trusted by the wearable device 120 and/or by the security network 160, and is both sides of the connection are approved, then the security key may be provided to the third party 168/receiver device 530 (step. 1440) in order to decrypt received encrypted data.

Figure 15:
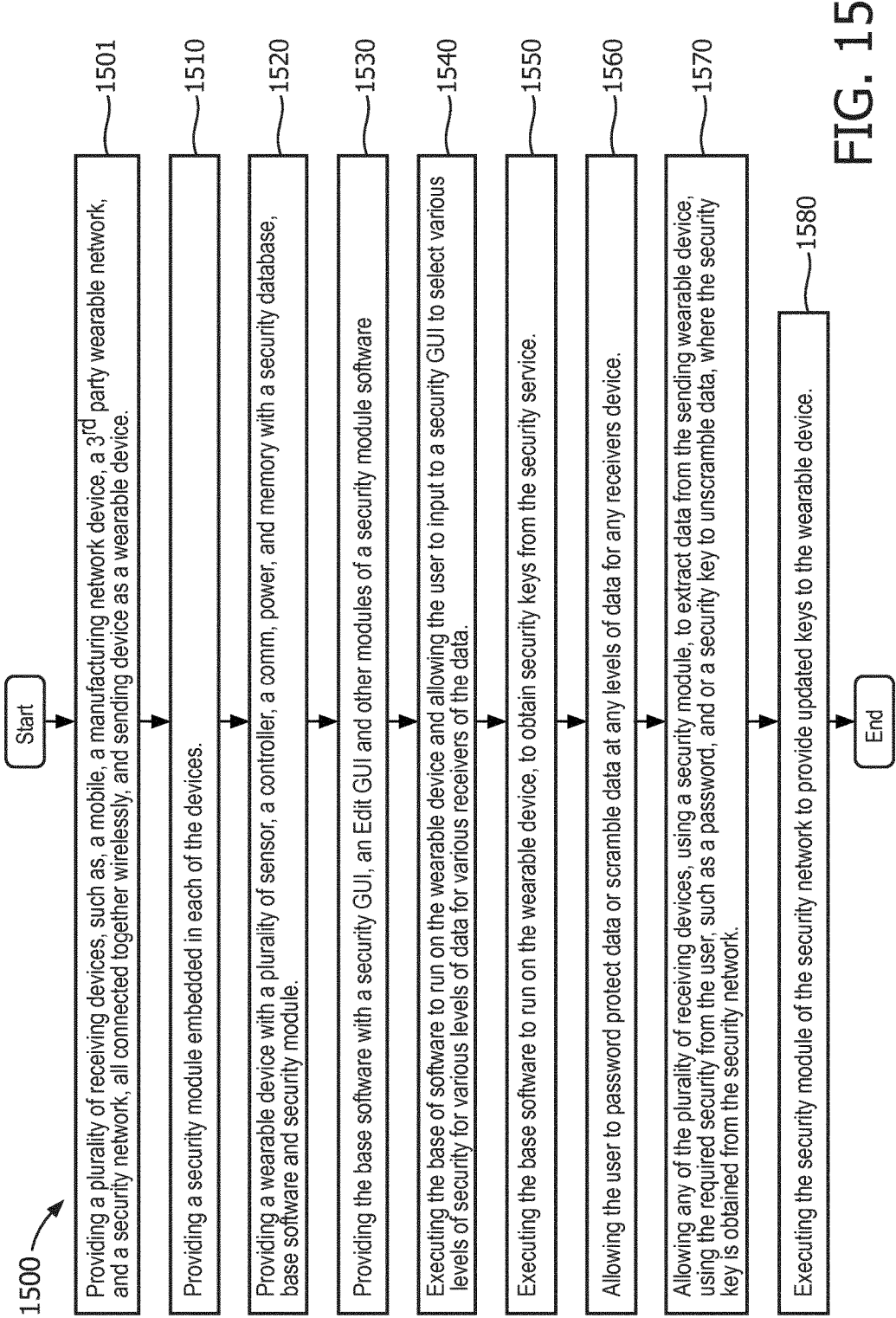
FIG. 15 illustrates an exemplary overall method.

FIG. 15 illustrates an exemplary overall method 1500. The method 1500 includes providing a plurality of receiving devices 530 (e.g., a mobile device 150, a brand/manufacturing network/device 180, a third party trusted network 170) and a security network 160, all connected to a wearable device 120 (step 1501), and providing a security module 144/154/164/174/184 embedded in each of the devices (e.g., receiving and sending) (step 1510). The wearable device 120 may be provided with a plurality of sensors 130, a processor 124, controls 134, a communication module 132, a power supply 126 and memory 136 (step 1520). The memory 136 of the wearable device 120 may include a security database 144, base software 140, a wearable sensor database 146, and security module 142 (step 1530). The base software 140 may provide a broadcaster GUI 310 and/or security GUI 325, an edit GUI 330, and security module software 144 for the user to utilize on the user wearable device 120.

The method further includes executing the base software 140 on the user wearable device 120 (step 1550), allowing the user to input data into the broadcaster GUI 310 and/or security GUI 325 with corresponding security levels (step 1560), obtaining security keys from the security network 160 based on whether the data will be scrambled, allowing the user to password protect data or scramble data using the obtained security keys for one or more of the receiving devices (step 1570), allowing into the plurality of receiver devices 530 a user security module 154/174/184 to extract data from the user wearable device 120, using required security authorization (e.g., security keys, passwords) from the user, and executing a security module 164 of the security network 160 to provide updated keys to the user wearable device 120 (step 1580).

Figure 16:
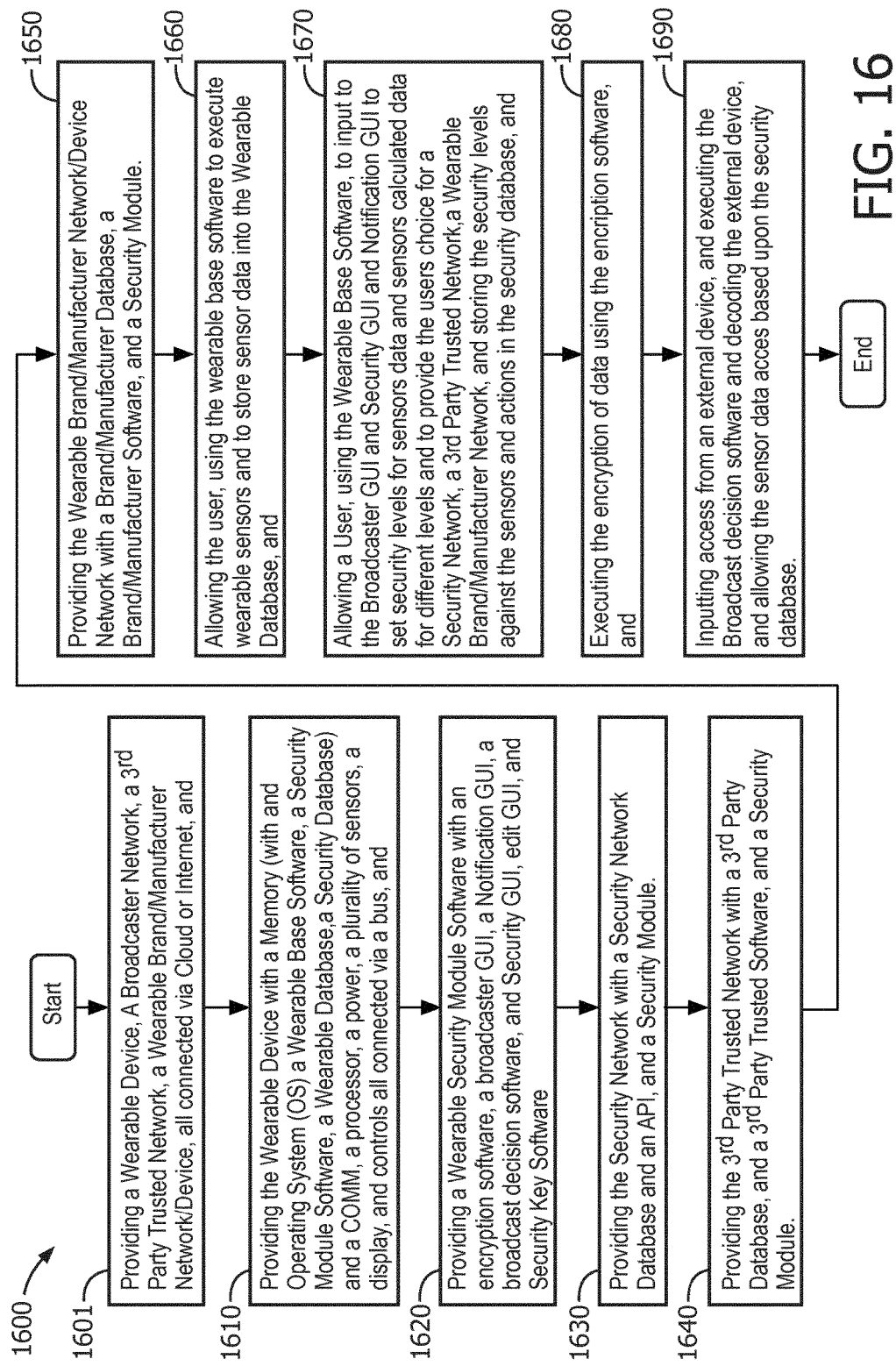
FIG. 16 illustrates a second exemplary overall method.

FIG. 16 illustrates a second exemplary overall method 1600. The method provides a wearable device 120, a security network 160, a third party trusted network/device 170, a wearable brand/manufacturer network/device 180, all connected via data network 101 (step 1601). The method also provides the wearable device 120 with a memory 136, with an operating system 138, a wearable base software 140, a wearable security module software 142, a wearable sensor database 146, a security database 144, a communication module 132, a processor 124, a power storage unit 126, a plurality of sensors 130, a display 128, and controls 134, all connected via bus 122 (step 1610). The method also provides a wearable broadcaster software for the wearable device 120, the wearable security module software 142 including an encryption software 305, a broadcaster GUI 310, a notification GUI 315, a broadcast decision software 320, a security GUI 325, an edit GUI 330, and a security key software 335 (step 1620). The method may also provide a mobile device 150 with a communications module 152 and memory 156 and security module 154 in the memory 156.

The method also provides the security network 160 with a security network database 162 and security module 164 and an API 166 (step 1630). The method also provides the third party trusted network/device 170 with third party database 172, a security module 174, a third party software 176 (step 1640). The method also provides the wearable brand/manufacturer network/device 180 with a wearable brand/manufacturer database 182 and a security module 184 and a wearable brand/manufacturer software 186 (step 1650).

The method allows a user—using the wearable base software 140—to execute wearable sensors 130 and to store sensor data into the wearable sensor database 146 (step 1660). The method also allows the user—using the wearable base software 140—to input information into the broadcaster GUI 310 and/or security GUI 325 and/or notification GUI 315, in order to set security levels for sensor data of sensors 130, and sensor-calculated data, where each data set can be set at different security levels, and each third party's access to each data set can be set at different security levels. The broadcaster GUI and notification GUI can also allow the users a choice of security network 160, third party trusted network/device 170, or wearable brand/manufacturer network/device 180. The wearable device 120 base software or broadcast decision software can then store and later access the security levels associated with the sensors in the wearable device 120's security database 144 where they are stored (step 1670). The method also allows the wearable security module software 142 to execute the encryption of data using the encryption software 305 and/or security key software 335 (step 1680), to allow data access and sharing to and from an external third party network/device 168, to execute the broadcast decision software, to decode external third-party device data, and to allow the wearable device 120's sensor data to be accessed based on the third party's entry in the wearable device 120's security database 144 (step 1690).

While the flow diagram in FIG. 16 shows a particular order of operations performed by certain embodiments, it should be understood that such order is exemplary (e.g., alternative embodiments can perform the operations in a different order, combine certain operations, overlap certain operations, etc.).

It should be apparent from the foregoing description that various example embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for secure connections, the method comprising:
    receiving a security level input at an interface of a wearable device, the security level input identifying a sensor set including one or more types of sensor measurements from one or more sensors of the wearable device, the security level input further identifying that data corresponding to the sensor set must be transmitted to a recipient device only according to a predetermined security level setting, the predetermined security level setting indicating at least whether the data corresponding to the sensor set is to be encrypted prior to transmission to the recipient device;
    determining, by the wearable device, that a sensor measurement data set is to be transmitted to another device, the sensor measurement data corresponding to the identified sensor set, wherein the sensor measurement data set comprises one or more sensor measurements from one or more sensors of the wearable device;
    receiving an edit input through an edit interface of the wearable device, the edit input editing the sensor measurement data prior to transmission of the sensor measurement data set from the wearable device to the recipient device; and
    transmitting the sensor measurement data set from the wearable device to the recipient device according to the predetermined security level setting identified by the security level input for the identified sensor set.

2. The method of claim 1, wherein transmitting the sensor measurement data set from the wearable device to the recipient device according to the security level setting includes:
    transmitting the sensor measurement data set from the wearable device to a security device according to the security level setting, wherein the security device is enabled to further transmit the sensor measurement data set to the recipient device according to the security level setting.

3. The method of claim 1, wherein the predetermined security level setting indicates that the sensor measurement data is to be password-protected prior to transmitting the sensor measurement data from the wearable device to the recipient device, the sensor measurement data un-readable without a correctly entered password.

4. The method of claim 1, further comprising:
    receiving a sender data set from a sender device identified by the security level input; and
    accepting the sender data set according to a second predetermined security level setting of the security level input.

5. The method of claim 1, further comprising transmitting a security key from the wearable device to the recipient device, wherein the security key can decrypt the sensor measurement data set.

6. The method of claim 1, wherein the sensor set includes a trigger data set that indicates alert actions to be performed by the wearable device based on a second one or more types of sensor measurements from the one or more sensors, the alert actions to alert a user of the wearable device that a second one or more sensor measurements are outside a predetermined sensor measurement range.

7. A system for secure connections, the system comprising:
a wearable device with a wearable memory and a wearable processor, wherein executing instructions stored in the wearable memory by the wearable processor:
receive a security level input at an interface of a wearable device, the security level input identifying a sensor set including one or more types of sensor measurements from one or more sensors of the wearable device and a trigger data set that indicates alert actions to be performed by the wearable device based on a second one or more types of sensor measurements from the one or more sensors, the alert actions to alert a user of the wearable device that a second one or more sensor measurements are outside a predetermined sensor measurement range, the security level input further identifying that data corresponding to the sensor set must be transmitted to a recipient device only according to a predetermined security level setting, the predetermined security level setting indicating at least whether the data corresponding to the sensor set is to be encrypted prior to transmission to the recipient device;
determine, by the processor, that a sensor measurement data set is to be transmitted to another device, the sensor measurement data corresponding to the identified sensor set, wherein the sensor measurement data set comprises one or more sensor measurements from one or more sensors of the wearable device; and
transmit the sensor measurement data set from the wearable device to the recipient device according to the predetermined security level setting identified by the security level input for the identified sensor set.

8. The system of claim 7, further comprising:
a security device with a security memory and a security processor, wherein executing instructions stored in the security memory by the security processor:
receives the sensor measurement data set along its path to the recipient device, and
transmits the sensor measurement data set from the wearable device to the recipient device according to the security level setting.

9. The system of claim 8, wherein executing instructions stored in the security memory by the security processor further transmits a security key from the security device to the recipient device, wherein the security key can decrypt the sensor measurement data set.

10. The system of claim 7, wherein the predetermined security level setting indicates that the sensor measurement data is to be password-protected prior to transmitting the sensor measurement data from the wearable device to the recipient device, the sensor measurement data un-readable without a correctly entered password.

11. The system of claim 7, wherein executing instructions stored in the wearable memory by the wearable processor further:
receives a sender data set from a sender device identified by the security level input; and
accepts the sender data set according to a second predetermined security level setting of the security level input.

12. The system of claim 7, wherein executing instructions stored in the wearable memory by the wearable processor further transmits a security key from the wearable device to the recipient device, wherein the security key can decrypt the sensor measurement data set.

13. A non-transitory computer-readable storage medium, having embodied thereon a program executable by a processor to perform a method for providing secure connections, the method comprising:
receiving a security level input at an interface of a wearable device, the security level input identifying a sensor set including one or more types of sensor measurements from one or more sensors of the wearable device, the security level input further identifying that data corresponding to the sensor set must be transmitted to a recipient device only according to a predetermined security level setting, the predetermined security level setting indicating at least whether the data corresponding to the sensor set is to be encrypted prior to transmission to the recipient device;
determining, by the wearable device, that a sensor measurement data set is to be transmitted to another device, the sensor measurement data corresponding to the identified sensor set, wherein the sensor measurement data set comprises one or more sensor measurements from one or more sensors of the wearable device;
receiving an edit input through an edit interface of the wearable device, the edit input editing the sensor measurement data prior to transmission of the sensor measurement data set from the wearable device to the recipient device; and
transmitting the sensor measurement data set from the wearable device to the recipient device according to the predetermined security level setting identified by the security level input for the identified sensor set.

* * * * *